US00RE42840E

(19) United States
(12) Reissued Patent
Todoroki et al.

(10) Patent Number: US RE42,840 E
(45) Date of Reissued Patent: Oct. 18, 2011

(54) STOOL FLUSHING DEVICE

(75) Inventors: Kentaro Todoroki, Fukuoka (JP); Kuniaki Shinohara, Fukuoka (JP); Toshio Koguro, Fukuoka (JP); Yuichi Furuta, Fukuoka (JP); Mie Ikushima, Fukuoka (JP)

(73) Assignee: Toto, Ltd., Fukuoka (JP)

(21) Appl. No.: 11/862,563

(22) Filed: Sep. 27, 2007

Related U.S. Patent Documents

Reissue of:
(64) Patent No.: 6,948,194
Issued: Sep. 27, 2005
Appl. No.: 10/487,748
PCT Filed: Aug. 13, 2002
PCT No.: PCT/JP02/08251
§ 371 (c)(1),
(2), (4) Date: Feb. 7, 2005
PCT Pub. No.: WO03/021052
PCT Pub. Date: Mar. 13, 2003

(30) Foreign Application Priority Data

Aug. 30, 2001 (JP) ..... 2001-261752
Feb. 27, 2002 (JP) ..... 2002-051333

(51) Int. Cl.
*E03D 13/00* (2006.01)
(52) U.S. Cl. ..... 4/304; 4/302; 4/303; 4/313
(58) Field of Classification Search ..... 4/302–305, 4/313, 623, DIG. 3
See application file for complete search history.

(56) References Cited

U.S. PATENT DOCUMENTS 4,041,557 A 8/1977 Ringler
4,141,091 A 2/1979 Pulvari
5,457,394 A 10/1995 McEwan
5,515,555 A 5/1996 Wormcke
5,821,427 A 10/1998 Byrd
6,067,673 A 5/2000 Paese et al.
6,206,340 B1 3/2001 Paese et al.
6,250,601 B1 6/2001 Kolar et al.
(Continued)

FOREIGN PATENT DOCUMENTS

DE 3210985 A1 3/1983
(Continued)

OTHER PUBLICATIONS

Partial European Search Report dated Jun. 26, 2007, issued in corresponding European Application No. 07008523.
(Continued)

*Primary Examiner* — Tuan N Nguyen
(74) *Attorney, Agent, or Firm* — Westerman, Hattori, Daniels & Adrian, LLP

(57) ABSTRACT

An object of the present invention is to provide a toilet cleaning device which is capable of cleaning a toilet stool by supplying cleaning water in an appropriate quantity corresponding to the state of usage by a user, which is provided with a self-diagnosis function for diagnosing cleaning water stoppage or the like, and which has a simple constitution so that maintenance can be performed easily. The output of a Doppler sensor 11 is amplified by an amp 31, and a frequency spectrum is determined by an FFT calculation portion 32. A flow rate is determined by conversion in a flow rate calculation portion 33 on the basis of the frequency spectrum. A controller 34 operates other devices on the basis of the flow rate calculated by the flow rate calculation portion 33 and the operational state of a cleaning instruction button 16. Cleaning water supply valve 36 is opened and closed in accordance with instructions from the controller 34. Electrolyzed water is generated in an electrolyzed water generating portion 38 to prevent the formation of urinary calculus in a drainpipe, and this electrolyzed water is discharged from a water spout when an electrolyzed water supply valve 39 is opened.

35 Claims, 28 Drawing Sheets

U.S. PATENT DOCUMENTS

| | | | |
|---|---|---|---|
| 6,279,173 | B1 | 8/2001 | Denzin et al. |
| 2001/0009404 | A1 | 7/2001 | Paese et al. |
| 2002/0171056 | A1 | 11/2002 | Paese et al. |

FOREIGN PATENT DOCUMENTS

| | | | |
|---|---|---|---|
| DE | 29518358 | U1 | 4/1996 |
| DE | 29916029 | U1 | 2/2000 |
| DE | 8908051 | | 1/2009 |
| EP | 0 353 183 | A1 | 1/1990 |
| EP | 0450955 | A1 | 4/1991 |
| EP | 0717289 | A1 | 6/1996 |
| EP | 0 783 058 | A2 | 7/1997 |
| EP | 0 826 982 | A1 | 3/1998 |
| EP | 0 880 014 | A1 | 11/1998 |
| EP | 1340861 | A1 | 9/2003 |
| GB | 2277941 | A | 11/1994 |
| JP | 2-66223 | A | 3/1990 |
| JP | 2-69760 | | 5/1990 |
| JP | 2-69760 | A | 5/1990 |
| JP | 1988-147996 | | 5/1990 |
| JP | 5-52622 | A | 3/1993 |
| JP | 6-146369 | | 5/1994 |
| JP | 6-146369 | A | 5/1994 |
| JP | 10-37284 | | 2/1998 |
| JP | 10037284 | A | 10/1998 |
| JP | 2001-137857 | A | 5/2001 |
| JP | 2001-194450 | | 7/2001 |
| JP | 2001-194450 | A | 7/2001 |
| JP | 2001-510900 | A | 7/2001 |
| JP | 2001-231716 | | 8/2001 |
| JP | 2001-231716 | A | 8/2001 |
| WO | 89/02012 | A1 | 3/1989 |
| WO | WO 99/04285 | | 7/1998 |
| WO | 99/04285 | | 9/2007 |

OTHER PUBLICATIONS

Partial European Search Report dated Aug. 17, 2007, issued in corresponding European Application No. 07008523.

European Patent Convention dated Feb. 3, 2010, issued in corresponding European Patent Application No. 07008523.

European Search Report dated May 6, 2008, issued in corresponding application No. 02 762 771.0-2303.

Search Report dated Jul. 1, 2005 issued in corresponding European Application No. 02 76 2771.

STOOL FLUSHING DEVICE

Matter enclosed in heavy brackets [ ] appears in the original patent but forms no part of this reissue specification; matter printed in italics indicates the additions made by reissue.

TECHNICAL FIELD

The present invention relates to a toilet cleaning device for cleaning a toilet stool, a water closet, and so on.

BACKGROUND ART

Conventionally, in order to automate the cleaning of the main body of a toilet following usage, a human detection sensor such as an infrared sensor is installed in the toilet stool, and if the human detection sensor detects a user for a fixed period of time or more, the sensor then detects the departure of the user and flushes the toilet stool with a fixed quantity of cleaning water. However, in such automatic cleaning systems based on human detection, the toilet stool is flushed with a fixed quantity of cleaning water regardless of whether the toilet stool has been used or the quantity of urine, leading to a great deal of waste.

A device for solving this problem, proposed in Japanese Patent Unexamined Publication No. H10-37284, detects variation in the water pressure at the trap portion of a toilet stool using a pressure sensor, and thereby detects variation in the water level of the trap portion, or in other words urination. According to this system, the fact that urination has occurred is detected, and hence cleaning water is not supplied mistakenly when a person stands before the toilet stool but does not urinate. Moreover, the quantity of urine that was passed is detected and cleaning water is supplied in accordance with the quantity of urine, and hence wasteful flushing using an unnecessarily large quantity of cleaning water does not occur.

Further, if cleaning water continues to be flushed into the toilet stool when the drain pipe is blocked, the water level rises such that the cleaning water overflows from the toilet stool, but by detecting the water level, a valve is controlled in advance such that an overflow of cleaning water from the main body of the toilet stool can be forestalled.

Also, the supply condition of the cleaning water can be detected by the pressure sensor, and hence warnings can be issued upon the detection of a "stoppage" or "leakage".

However, this cleaning system using a pressure sensor is constituted such that the trap portion and pressure sensor are connected by piping in order to detect the water pressure inside the trap, and hence water tightness must be secured in the piping connection portion at the trap portion over a long period of time. However, in reality this is not easy. Moreover, a protective member is required for preventing the infiltration of liquid or harmful gas into the sensor portion, making assembly difficult. To prevent the water pressure-detecting piping portion from blocking, a portion of the cleaning water is supplied to clean the piping, but this leads to an even more complex constitution, making assembly difficult and becoming a possible cause of breakdowns. Moreover, when a breakdown occurs in the piping portion, repairs from the back portion of the toilet stool can proceed only when the toilet stool is separated from the water supply pipe and drain pipe and moved away from the wall surface, and hence this system is highly unrealistic.

The basic issue in detecting the water pressure at the trap portion is the influence on pressure variation in the drain pipe.

More specifically, in general a drain pipe is connected to the drainage portions of a plurality of instruments such as toilet stools and wash basins, whereby the drainage from each individual instrument is collected and transmitted to a sewerage facility. The pressure inside the drainpipe varies constantly depending on the drainage from the plurality of instruments, and the water pressure inside the trap of the toilet stool varies in accordance therewith. Hence in reality, it is difficult to detect only urine reliably.

DISCLOSURE OF THE INVENTION

The present invention has been designed in consideration of the background described above, and it is an object thereof to solve the aforementioned problems by supplying cleaning water appropriately according the usage condition. Another object is to conserve water by self-diagnosing cleaning water stoppage or leakage and issuing a corresponding warning. A further object of the present invention is to provide a toilet cleaning device with a simple constitution such that repairs can be performed easily in the event of a breakdown. Further objects of the present invention will be clarified in the following description of the embodiments.

To solve the problems described above, according to the present invention, a toilet cleaning device for controlling the opening/closing of a valve, which is disposed in a toilet stool, comprises cleaning water pipe with a valve which enables cleaning water to be supplied to a toilet main body. The device is characterized in comprising transmission means for transmitting radio waves toward a bowl portion interior space of a toilet stool or a space in the vicinity of an opening portion of the bowl portion, reception means for receiving reflected waves of the radio waves transmitted by the transmission means, a Doppler sensor provided for generating a differential signal corresponding to the difference between the frequency of a signal received by the reception means and the frequency of a signal transmitted by the transmission means, frequency analysis means for analyzing the frequency of the output of the Doppler sensor, liquid flow condition calculation means for calculating the liquid flow condition in the bowl portion interior space based on the output of the frequency analysis means, and control means which perform control of the valve in accordance with the calculation result of the liquid flow condition calculation means.

A radio wave (in particular, microwave or millimeter wave) Doppler sensor is used to detect objects (movements) using the Doppler effect according to the following principles.

Basic equation: $\Delta F = F_S - F_b = 2 \times F_S \times v/c$ $\Delta F$: Doppler frequency
$F_S$: transmission frequency
$F_b$: reflection frequency
V: rate of travel of object
c: speed of light ($300 \times 10^6$ m/s)
$F_s$ transmitted from an antenna is reflected by an object, receives a Doppler frequency shift caused by the relative motion v, and thus becomes $F_b$. At this time, a frequency difference $\Delta F$ between the transmitted wave and reflected wave can be extracted as a detection signal.

It has been confirmed experimentally that when a Doppler sensor is directed toward a flow of water, a signal with a frequency corresponding to the flow velocity of the water is outputted. FIG. 24 shows a frequency spectrum of the output of the Doppler sensor determined when the Doppler sensor is directed toward a flow of water. By varying the flow velocity, the obtained spectrum changes. If the relationship between the peak frequency and flow velocity, for example, is illustrated on a graph, the result is as shown in FIG. 25, and hence it can be said that there is a correlation between the flow velocity and the frequency characteristic of the output of the Doppler sensor.

Hence a signal at a frequency corresponding to the velocity of a flow of urine or cleaning water is outputted from a Doppler sensor which transmits radio waves toward the bowl portion interior space of a toilet stool. By frequency-analyzing the output of the Doppler sensor to determine by calculation the presence, quantity, temporal flow rate change, and so on of a liquid flow along the bowl surface such as urine or cleaning water, the opening timing, closing timing, and soon of the valve can be controlled appropriately in accordance therewith.

Here, if the toilet stool is formed from ceramics, resin, or the like, the radio waves pass through, and hence the Doppler sensor may be disposed on the inside of the toilet stool. In so doing, the sensor will not be caused to corrode by cleaning water or excrement. Further, the sensor cannot be seen, and hence the outer appearance of the toilet stool is good and the sensor is unlikely to be tampered with. Moreover, the constitution is simple, facilitating assembly of the product.

Further, the frequency analysis means can output a frequency spectrum by Fast Fourier Transform, and the liquid flow condition calculation means can determine the presence of a liquid flow according to the presence of a frequency at or above a predetermined threshold.

By using FFT (Fast Fourier Transform), the frequency spectrum of the output of the Doppler sensor is obtained in real time. Urine and cleaning water can be detected from the obtained frequency spectrum.

Alternatively, the frequency analysis means may be constituted by a filter which passes only signals with a frequency in a specific range, whereby the liquid flow condition calculation means determine the presence of a liquid flow by comparing the output of the filter with a predetermined threshold.

By setting the passband of the filter in advance to align with the frequency distribution of the output signal from the Doppler sensor in relation to urine flow or cleaning water flow, urine flow and cleaning water flow can be detected.

The liquid flow condition calculation means may comprise time measuring means for measuring the time period during which it is determined that a liquid flow is present.

According to the constitution described above, a momentary flow rate relating to urine is set as a representative value, and by multiplying this representative value with the urination duration, an approximate total urine quantity can be learned easily. By determining the total urine quantity, an appropriate quantity of cleaning water commensurate with the total urine quantity can be supplied, enabling water conservation. As regards cleaning water, by learning the time period during which cleaning water actually flows into the toilet stool and comparing this with the time during which the valve is instructed to open, a "stoppage" or "pipe blockage" can be detected and appropriate measures can be taken.

The liquid flow condition calculation means may calculate the liquid flow rate on the basis of a maximum value of the frequency spectrum generated by Fast Fourier Transform.

Since there is a correlation between the frequency spectrum of the output of the Doppler sensor and the liquid flow velocity, the liquid flow rate can be charted on the basis of the FFT output.

In so doing, the momentary liquid flow rate can be learned. If the momentary flow rate of the cleaning water is too low, then the excrement cannot be discharged from the toilet stool. Conversely, if the momentary flow rate is too high, the total cleaning water quantity becomes too large, causing waste through water spray, and hence the momentary flow rate is preferably within an appropriate range. By obtaining the momentary cleaning water flow rate, various measures can be taken.

In the case of persons troubled with urinary passage impairment, the momentary urine flow rate of a person and temporal change thereof differs from those of ordinary persons. Hence by means of this device, urination function can be examined easily.

The liquid flow condition calculation means are capable of calculating the total liquid flow quantity by totaling the liquid flow rate during the time period in which it is determined that a liquid flow is present.

By integrating the momentary liquid flow rate, the total flow quantity can be obtained more accurately. As a result, an appropriate quantity of cleaning water commensurate with the total urine quantity can be supplied, enabling water conservation. By accurately obtaining the quantity of cleaning water which actually flows into the toilet stool, the quantity of cleaning water can be controlled appropriately.

The Doppler sensor is capable of transmitting radio waves from the transmission means in a substantially parallel direction to the flow direction along an inner wall surface of the bowl portion of the toilet stool.

The Doppler sensor outputs signals at a frequency based on the travel velocity of the object to be detected. In this case, travel velocity signifies that components in an identical direction to the direction of radio wave transmission and reception are reflected largely in the output signal, and components in other directions are substantially not reflected as sensor output signals. Accordingly, to obtain a large signal, it is preferable that the direction of radio wave transmission and reception accords with the liquid flow direction as possible. The flow of cleaning water flows along the inner wall surface of the toilet bowl portion in order to rinse away stains on the inner wall surface. Urine, meanwhile, usually hits the inner wall surface of the bowl portion and then flows along the inner wall surface. Hence by making the direction of radio wave transmission and reception substantially parallel to the flow direction along the inner wall surface of the bowl portion, a large sensor output signal can be obtained. As a result, noise has little effect, distortion in the sensor characteristic is unlikely to have an effect, and thus urine flow or cleaning water flow can be detected accurately.

The Doppler sensor is also capable of transmitting radio waves from the transmission means substantially in the direction toward a user position.

As described above, the Doppler sensor preferably transmits radio waves parallel to the movement direction of the object to be detected. Accordingly, when measuring a flow of urine in release, the urine is released from a user, and hence the radio waves are preferably transmitted from the Doppler sensor substantially in the direction of the user.

Another effect of the present invention is that the presence of a user can be detected simultaneously. Typically, the flow velocity of urine is approximately 2 m/sec, but the travel velocity of a human body in the vicinity of a toilet stool is less than half of that. Since The frequency of the output signal of the Doppler sensor differs depending on the velocity, the frequency analysis means are capable of distinguishing between a human body and urine flow. Since the presence of a user can be detected simultaneously, a water film can be formed over the inner wall surface of the bowl portion (pre-cleaning) by supplying cleaning water when a user is detected, for example, and thus preventing a stain from clinging more effectively. Alternatively, cleaning water is supplied only when both a human body and urine are detected, for example, and thus enabling an improvement in the certainty with which urine is detected.

The toilet cleaning device may further comprise outside output means for outputting the output of the liquid flow condition calculation means to the outside of the toilet cleaning device.

By outputting information regarding the calculation results outputted by the liquid flow condition calculation means to the outside as a signal, this information can be used in other devices. Further, so as to get attention of a person, the information outputted by the liquid flow condition calculation means may be outputted outside visually or audibly in the form of a message, audio, or similar.

Urine flow indicates the state of the urinary system, and hence by outputting information relating thereto, this information can be used for medical care and health management. By outputting information relating to the flow of the supplied cleaning water to the outside, measures can be taken to ensure an appropriate cleaning water flow.

When the liquid flow condition calculation means determine that a liquid flow has disappeared, the valve can be opened to supply cleaning water.

In this way, cleaning water is supplied only when urine is present, and hence wasteful water use can be prevented.

Further, the Doppler sensor transmits radio waves from the transmission means substantially in the direction of the user, and the toilet cleaning device comprises user detection means for detecting the presence of a user of the toilet stool on the basis of the output of the Doppler sensor. Accordingly, the valve can also be opened and cleaning water supplied when the liquid flow condition calculation means determine that a liquid flow has disappeared and the output of the user detection means detects that no user is present.

Urination sometimes ceases and then restarts, but according to the constitution described above, cleaning water is supplied after the user has moved away following urination, and hence cleaning water can be prevented from being supplied two or more times in relation to a single urination, thus eliminating the wasteful use of water.

When a predetermined length of time or more elapses after the liquid flow condition calculation means determine that the liquid flow has disappeared, the valve can be opened and cleaning water supplied.

Urination sometimes ceases and then restarts, but according to the constitution described above, cleaning water is prevented from being supplied several times in relation to one urination due to being misled by a brief interruption in the urination, and thus wasteful use of water is eliminated.

The valve may be prohibited from being opened until a predetermined length of time elapses after the valve is closed following the opening of the valve.

The flow velocities of the cleaning water and urine flowing along the inner wall surface of the bowl portion sometimes take similar values, and hence it may be impossible to differentiate between the two. It is wasteful in such a case to mistake cleaning water for urine and then supply cleaning water again. When the valve is open, cleaning water continues to flow for a while even after closing the valve, and hence by prohibiting opening of the valve during this period such that cleaning water is not re-supplied, such waste can be prevented.

The control means may comprise cleaning condition determination means for determining the cleaning water supply condition based on the state of instruction to the valve and the output of the liquid flow condition calculation means, and the output of the cleaning condition determination means may be outputted to the outside of the toilet cleaning device.

In the constitution described above, the state of instruction to the valve is one of either "open" or "close". Meanwhile, the flow rate of the cleaning water is obtained from the output of the liquid flow condition calculation means. Hence, the cleaning condition determination means determine whether the flow rate is within the appropriate range when the state of instruction is "open", for example. Also, the cleaning condition determination means determine whether the flow rate is zero when the state of instruction is "close", for example. Thus the cleaning condition can be self-diagnosed using the Doppler sensor. The outside output means may output the output of the cleaning condition determination means as a signal for use in an external system, or the outside output means may be constituted as means for notifying a person, such as a display or buzzer.

According to the constitution described above, in cases where cleaning water is not supplied when it should be due to a water stoppage caused by a defect in the water supply equipment, stuffing up the cleaning water pipe which is connected to the toilet stool, a defect in the valve, and so on, for example, occurrence of those troubles can be detected and outputted to the outside, and hence the user or manager can deal with those troubles. Conversely, in cases where cleaning water continues to be supplied even though the valve which is connected to the toilet stool has been instructed to "close", due to a defect in the valve, this trouble can be detected and outputted to the outside, and hence the user or manager can deal with this trouble.

Further, an appropriate range for the quantity of supplied cleaning water exists for discharging excrement from the toilet stool, and in reality, this range varies according to the pressure of the water supply. According to the constitution described above, cleaning water flows when the valve has been instructed to "open", but when the flow rate thereof is not within the predetermined appropriate range, this is outputted to the outside, and hence the pressure of the water supply can be adjusted manually or automatically by an external system such that measures can be taken to ensure an appropriate quantity of cleaning water.

The valve may comprise cleaning water quantity adjustment means, and control means for controlling the cleaning water quantity adjustment means based on the output of the liquid flow condition calculation means.

In this case, the flow rate of the cleaning water is calculated by the liquid flow condition calculation means.

An appropriate range for the quantity of supplied cleaning water exists for discharging excrement from the toilet stool, and in reality, this range varies according to the pressure of the water supply. The flow rate of the cleaning water, determined by calculation according to the constitution described above, is therefore adjusted by the cleaning water quantity adjustment means for keeping in the appropriate range, and hence an appropriate quantity of cleaning water is supplied automatically.

Urinary calculus prevention fluid supply means may also be provided for supplying urinary calculus prevention fluid into the drain pipe to prevent the formation of urinary calculus in the drain pipe.

Here, the urinary calculus prevention fluid may be any fluid which is capable of suppressing the formation of urinary calculus. For example, hypochlorous acid or the like is favorable. The urinary calculus prevention fluid may be supplied into the drain pipe periodically or in accordance with-the quantity of urine.

When water conservation is realized according to the present invention, the toilet stool itself is cleaned sufficiently, but the urine concentration in the drain pipe is higher than in conventional cases. As a result, more urinary calculus are formed in the drain pipe, leading to a increase in the quantity of labor for removing the urinary calculus. According to the constitution described above, however, the formation of urinary calculus in the drain pipe can be suppressed while conserving water, and hence the quantity of labor for maintaining the drain pipe does not increase.

A control portion which opens the valve to supply cleaning water immediately upon detection of a liquid flow by the liquid flow condition calculation means may also be provided.

According to this constitution, cleaning water is supplied to the toilet stool immediately after urine is detected to form a water film over the inner liquid surface of the bowl portion, and hence staining of the inner liquid surface of the bowl portion can be prevented. Further, when cleaning water is supplied by detection of a user, water may be used wastefully if the user departs without urinating, but according to this constitution, this concern is eliminated.

The Doppler sensor may be disposed in the interior of the toilet main body such that the transmission direction of the radio waves from the transmission means is substantially orthogonal to the interior surface of the main body of the toilet stool.

When the Doppler sensor is disposed on the inside of the toilet stool, a portion of the radio waves from the transmission means is reflected due to mismatching of the media on the interior surface of the toilet main body. According to the constitution described above, however, the radio waves that are reflected on the interior surface of the toilet main body are reflected again by the Doppler sensor, and thus directed in the original transmission direction. As a result, even stronger radio waves pass through the toilet main body, leading to an improvement in sensitivity.

The Doppler sensor may be disposed in the interior of the toilet main body, and a plate material for preventing the reflection of radio waves on the surface of the toilet main body may be provided in close contact with the region on the surface of the toilet main body through which radio waves transmitted from the transmission means pass.

Typically, the following matters are known. Radio waves moving from a medium A having a wave impedance of $Z_A$ toward a medium B having a wave impedance of $Z_B$ are partially reflected at the interface if $Z_A$ and $Z_B$ are different. However, by inserting a medium having a wave impedance of $\sqrt{(Z_A Z_B)}$ and a thickness of $\lambda (2n+1)/4$ (where $\lambda$ is the wavelength and n is an integer) is inserted between the medium A and the medium B, matching of $Z_A$ and $Z_B$ can be achieved such that the reflection is eliminated.

The propagation velocity v of radio waves with a frequency f through a medium having a permittivity of $\epsilon$ and a permeability of $\mu$ is $1/\sqrt{(\epsilon \mu)}$, and hence the wavelength $\lambda$ is $\lambda=v/f=1/f\sqrt{(\epsilon \mu)}$, whereby $\lambda (2n+1)/4=(2n+1)/(4f\sqrt{(\epsilon \mu)})$. In other words, by disposing a plate material having a wave impedance of $\sqrt{(Z_0 Z_2)}$ (where $Z_0$ is the atmospheric wave impedance, and $Z_2$ is the wave impedance of the toilet main body) and a thickness of $(2n+1)/(4f\sqrt{(\epsilon \mu)})$ (where $\epsilon$ is the permittivity, is the permeability, n is an integer, and f is the radio wave frequency) in close contact with the region of the toilet main body surface through which radio waves transmitted from the transmission means pass, reflection on the toilet main body surface can be eliminated.

To put it simply, when the Doppler sensor is disposed inside a toilet main body which is constituted by a substantially uniform medium, a portion of the radio waves from the transmission means is reflected on the inner portion surface and outer portion surface of the toilet main body due to media mismatching, but according to the constitution described above, wave impedance matching can be achieved, and hence reflection is reduced, enabling stronger radio waves to pass through the toilet main body and thereby improving sensitivity.

A water spout portion is disposed downstream of the valve for discharging cleaning water to the inner wall surface of the bowl portion, and the discharge velocity from the water spout portion is caused to differ from a typical urine flow velocity.

The discharge velocity from the water spout portion is a value obtained by dividing the water flow rate ($m^3/s$) from the water spout portion by the sectional area ($m^2$) of the water flow, and this is affected in the frequency of the output of the Doppler sensor. Hence, by causing the discharge velocity from the water spout portion to differ from a typical urine flow velocity (for example, 1.4 to 2.8 m/s), the frequency of the output of the Doppler sensor differs in relation to each.

As a result, urine flow can be recognized even when a subsequent user urinates during cleaning by the previous user and so on, enabling accurate measurement of the urine quantity.

Another aspect of the present invention comprises opening/closing means for opening and closing a toilet seat and toilet lid which are rotatably mounted on the toilet main body, and user detection means for detecting the presence of a user of the toilet stool based on the output of the Doppler sensor, the control means for instructing the opening/closing means to open the toilet seat and toilet lid when a user is detected by the user detection means, and instructing the opening/closing means to close the toilet seat and toilet lid when the user detection means cease to detect the user following detection of a liquid flow by the liquid flow condition calculation means, and then open the valve such that cleaning water is supplied.

According to this constitution, the toilet seat and toilet lid are opened automatically when a user approaches, and the toilet seat and toilet lid are closed automatically when the user urinates and departs, whereupon cleaning is performed. By means of this action, the effects of an improvement in user-friendliness due to the automatic opening and closing of the toilet seat and toilet lid, and an improvement in hygiene due to the reduction in cases touching the toilet seat and toilet lid. In terms of structure, both a liquid flow, in other words urine flow and cleaning water flow, can be detected by a single Doppler sensor, and hence the number of components can be reduced. The space occupied by the component is also reduced, therefore we can achieve miniaturization of the device.

The control means also determine whether or not a user has approached the toilet main body and whether or not urination has been performed into the bowl portion on the basis of output signals from the Doppler sensor. Hence, when the user approaches the toilet main body, cleaning water can be supplied briefly to perform pre-cleaning, and when the user completes urination, cleaning water can be supplied in accordance with the quantity of urine to perform post-cleaning.

Moreover, the control means are capable of supplying cleaning water in accordance with the total liquid flow quantity, and also of adjusting at least one of the concentration of the urinary calculus prevention fluid or the supply rate of the urinary calculus prevention fluid in accordance with the total liquid flow quantity.

Meanwhile, the Doppler sensor may be provided such that oscillatory waves are transmitted from the back face side of the toilet main body through the toilet main body toward the bowl portion interior space of the toilet stool, and at least the part of the toilet main body through which these oscillatory waves pass may be partially or entirely formed so as to be permeable to the oscillatory waves.

Note that the Doppler sensor may be any sensor which generates any one of radio waves, light waves, and sound waves as these oscillatory waves, and which outputs signals based on the difference between the transmission frequency and reception frequency thereof.

BEST MODE FOR CARRYING OUT THE INVENTION

Embodiments of the present invention will be described below on the basis of the drawings.

Figure 1:
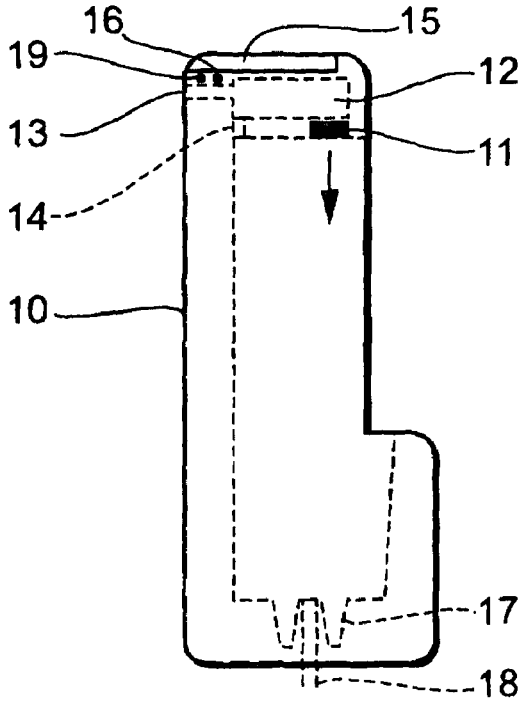
FIG. 1 is a constitutional diagram of a toilet stool according to an embodiment of the present invention.

FIG. 1 is a view showing the constitution of a toilet stool to which the toilet cleaning device of the present invention is applied. A Doppler sensor 11 and a function portion 12 are installed in the interior of a toilet stool 10. The upper end of the toilet stool 10 is a lid 15, and hence maintenance work on the space which accomodates the Doppler sensor 11 and function portion 12 can be performed easily. A water supply portion 13 is provided in the upper back face of the toilet stool 10 for supplying water to clean the space inside a bowl portion of the toilet stool 10. Cleaning water spout 14 is provided in the upper portion of the bowl portion interior space. A cleaning instruction button 16 for discharging the cleaning water to the bowl portion interior space at the discretion of a sanitation worker, and a lamp 19 for notifying the condition of the toilet cleaning device are installed in an inconspicuous location on the outside of the toilet stool. A trap portion 17 and a drain 18 are provided in the lower portion of the bowl portion interior space to form a water seal.

When urine is detected by the Doppler sensor 11 or the cleaning instruction button 16 is operated, the cleaning water is supplied from the water supply portion 13 and discharged from the cleaning water spout 14 via the function portion 12 so as to rinse the bowl portion interior space. The cleaning water then passes through the trap portion 17 and is drained from the drain 18. Here, the cleaning water spout 14 is disposed so as to wash away stains on the inner wall surface of the bowl portion interior space, and hence the cleaning water flows downward along the inner wall surface of the bowl portion. Meanwhile, the urine released by a user sometimes impinges on the inner wall surface of the bowl portion and then flows downward along the inner wall surface of the bowl portion, and is sometimes released directly toward the lower interior portion of the bowl portion. In both cases, the flow of urine from its release by the user to the trap portion 17 is substantially parallel to the inner wall surface of the bowl portion. The Doppler sensor 11 is disposed using an anchor such that radio waves are transmitted in a parallel direction to the inner wall surface of the bowl portion, and hence the cleaning water and urine signals can be obtained at a high S/N ratio and low distortion.

Figure 2:
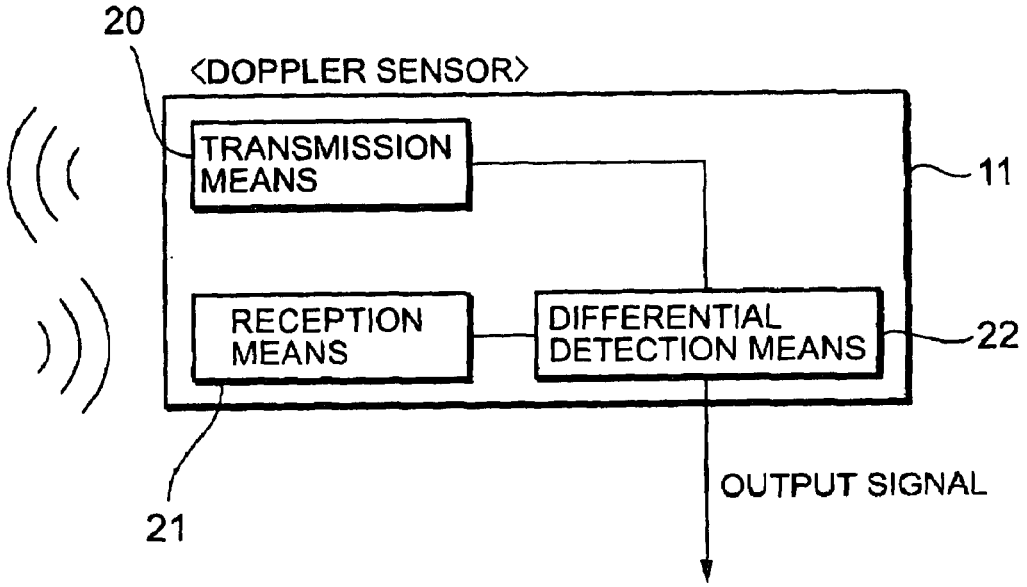
FIG. 2 is a functional block diagram of a Doppler sensor according to an embodiment of the present invention.

FIG. 2 is a functional block diagram of the Doppler sensor 11. The Doppler sensor 11 is constituted, for example, by transmission means 20 for transmitting 10.525 GHz microwaves, reception means 21 for receiving reflected waves, and differential detection means 22 for outputting the difference in frequency between the transmission means 20 and reception means 21. Note that in this embodiment, a Doppler effect using radio waves is employed, but the present invention is not limited thereto, and a Doppler sensor which uses light waves such as infrared rays or sound waves such as ultrasonic waves, for example, may be used.

Figure 3:
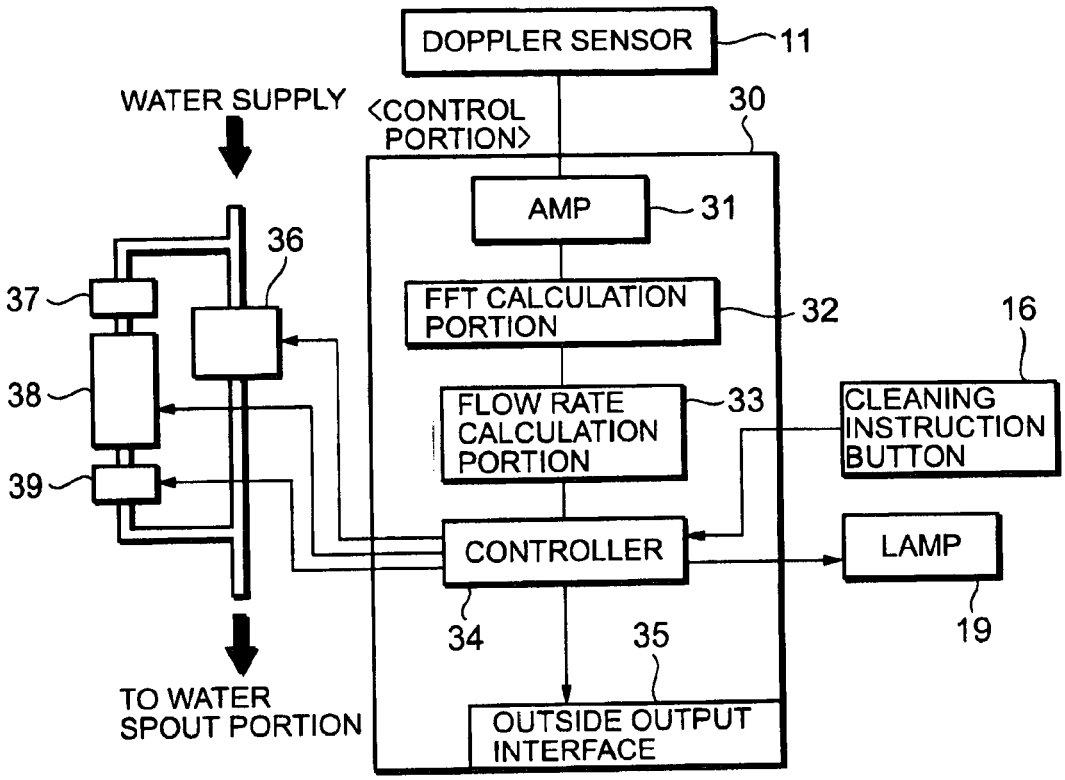
FIG. 3 is a functional block diagram of the toilet stool according to an embodiment of the present invention.

FIG. 3 is a block diagram showing a specific example of a function portion 12. The output of the Doppler sensor 11 is amplified by an amp 31, and a frequency spectrum is calculated by an FFT calculation portion 32. The output is then converted to a flow rate in a flow rate calculation portion 33 on the basis of the frequency spectrum. A controller 34 operates other devices on the basis of the flow rate calculated by the flow rate calculation portion 33 or the operational state of the cleaning instruction button 16. Cleaning water supply valve 36 is opened and closed according to an instruction from the controller 34. Electrolyzed water for preventing the formation of urinary calculus in the drain pipe is generated in an electrolyzed water generating portion 38, and when an electrolyzed water supply valve 39 is opened, electrolyzed water is discharged from the cleaning water spout 14. Further, a check valve 37 is provided on the upstream side of the electrolyzed water generating portion 38 so that electrolyzed water generated in the electrolyzed water generating portion 38 does not flow back toward the water supply source. The controller 34 is set to supply electrolyzed water at least once a day, or more frequently in accordance with the usage frequency. An outside output interface 35 is provided to transmit information outside. The quantity of urine calculated by the flow rate calculation portion 33 is transmitted outside via the outside output interface 35. Further, when it is determined by the controller 34 that a trouble occurs in the toilet cleaning device, this is notified to the outside via the outside output interface 35, and simultaneously, the lamp 19 is caused to flash in order to notify an administrator.

The electrolyzed water generating portion 38 will now be described in more detail. The electrolyzed water generating portion 38 generates electrolyzed water by applying an electric current to electrodes containing silver such that Ag ions are eluted into the water. By adjusting the magnitude of the current value that is applied to the electrodes or the duration of the current, the concentration of Ag ions in the electrolyzed water can be controlled.

Figure 4:
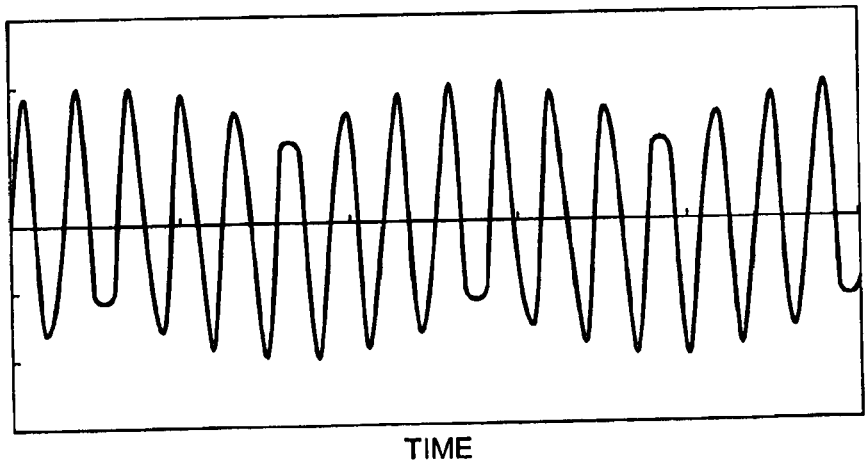
FIG. 4 shows the waveform of an output signal from the Doppler sensor during urination.

The actions of the toilet cleaning device constituted as described above when a user urinates will be described hereinafter. FIG. 4 is a waveform of an output signal from the Doppler sensor 11 during urination. The amp 31 amplifies this signal. The FFT calculation portion 32 performs calculation processing on the output of the amp 31 at a fixed cycle of 500 ms in order to calculate a frequency spectrum such as that shown in FIG. 5, for example. Naturally, this frequency spectrum differs according to the flow of the urine, and hence varies upon each calculation. Note that here, the FFT calculation cycle is set at 500 ms, and if the calculation cycle is shortened, variation in the flow rate can be grasped more accurately. Conversely, if the calculation cycle is lengthened, the calculation speed slows, and hence a low-cost constitution can be obtained.

Figure 5:
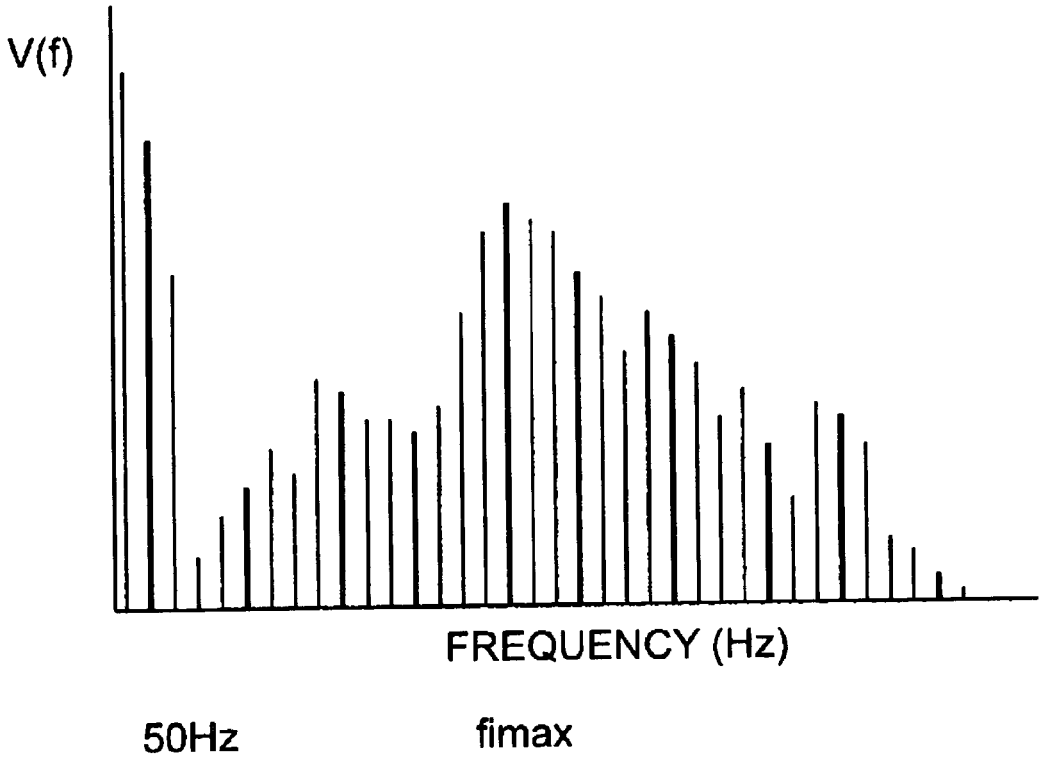
FIG. 5 shows a frequency spectrum determined by an FFT calculation portion.

As shown by the frequency spectrum in FIG. 5, when a person urinates, there are maximum values (fmax) at a lower frequency band of less than 50 Hz and also a higher frequency band of more than 50 Hz. It is understood that the maximum value (fmax) at the high frequency correlates with the urine flow rate. Hence the flow rate calculation portion 33 determines the frequency (fmax) which is the maximum value of more than 50 Hz at least, and then refers to a preset conversion table for converting the frequency into a momentary flow rate, therefore the momentary flow rate is calculated on the basis of this frequency.

Figure 6:
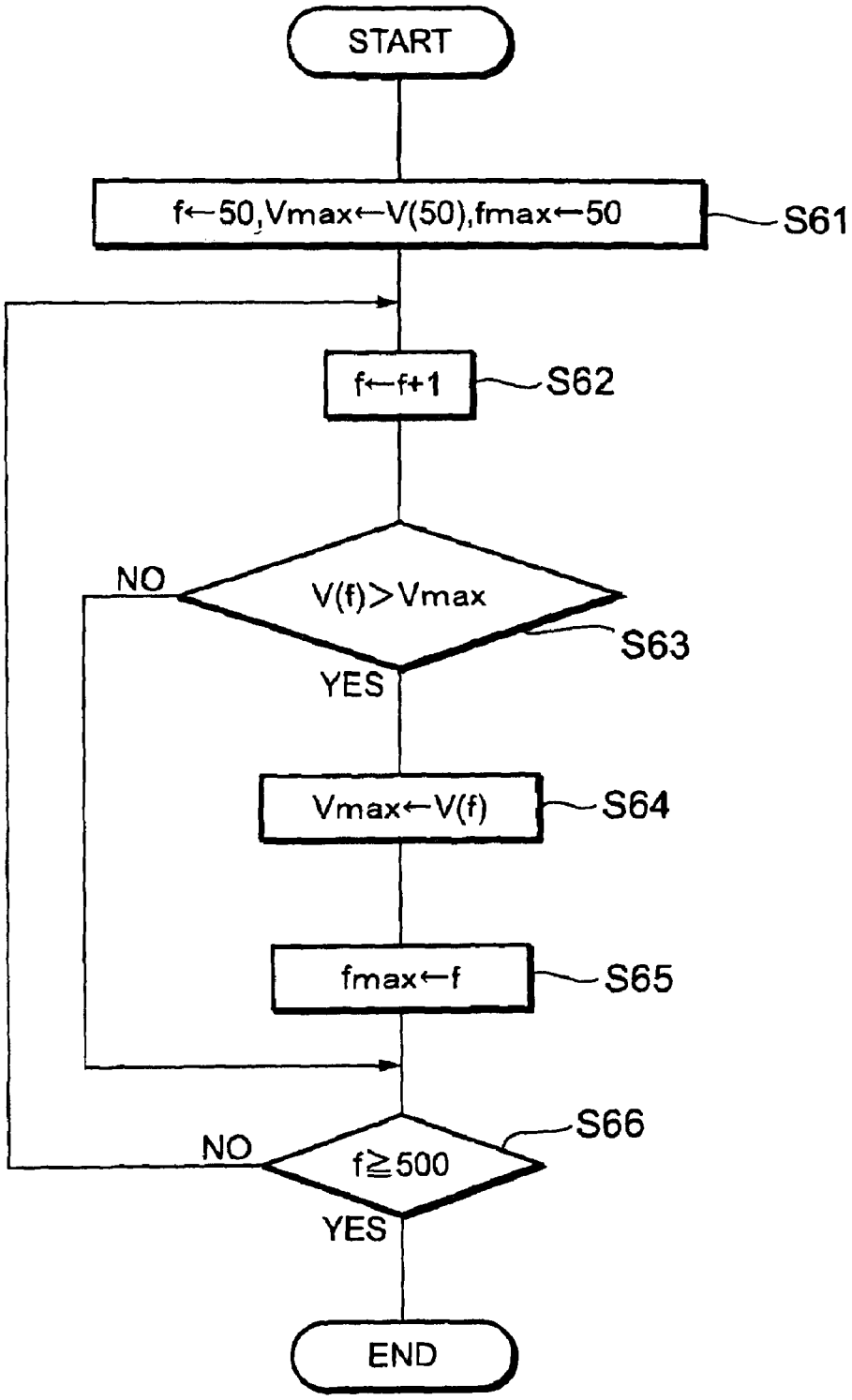
FIG. 6 is a flowchart showing an example of a sequence for determining a maximum frequency value from the frequency spectrum.

Every time the frequency spectrum is calculated by the FFT calculation portion 32, the flow rate calculation portion 33 determines a maximum value frequency (fmax) of more than 50 Hz at least. An example of a method will now be explained using the flowchart in FIG. 6. Variables known as f, Vmax, and fmax are secured in memory in advance, and firstly, 50 is stocked in F, V(50) is stocked in Vmax, 50 is stocked in fmax (S61). Note that V(50) indicates the 50 Hz signal level calculated by the FFT calculation portion 32. Next, 1 is added to f (S62), V(f) is compared to Vmax (S63), and only when V(f) exceeds Vmax, Vmax is updated to V(f) (S64) and fmax is updated to f (S65). Next, a determination is made as to whether f has reached 500 (S66), and if f is less than 500, the sequence returns to the processing of S62*. If f is 500, the sequence ends. In this manner, eventually a maximum frequency of at least 50 Hz is recorded in fmax.

Figure 7:
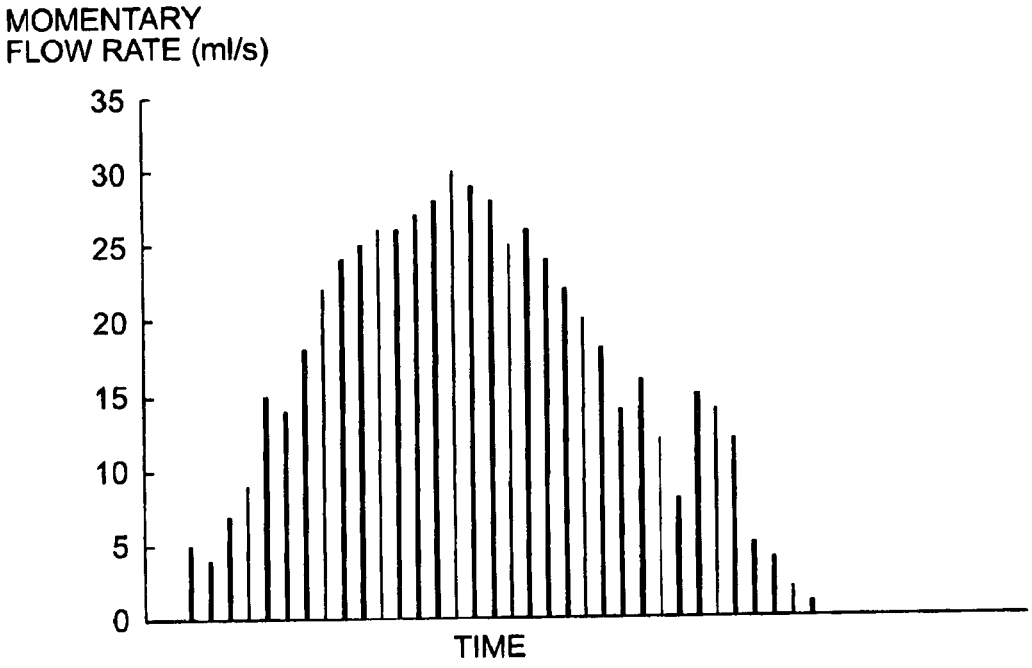
FIG. 7 is a graph showing an example a flow rate determined in a flow rate calculation portion.

The flow rate calculation portion 33 calculates the momentary flow rate by applying fmax calculated as described above to a preset conversion equation. An example of a flow rate calculated by the flow rate calculation portion 33 is shown in FIG. 7. The controller 34 is capable of transmitting these flow rate data outside through the outside output interface 35. For example, a doctor can examine the health of a user on the basis of these data. The controller 34 opens the cleaning water supply valve 36 to begin cleaning, after it determines for certain that urination is complete on the basis of the calculated urine flow.

Figure 8:
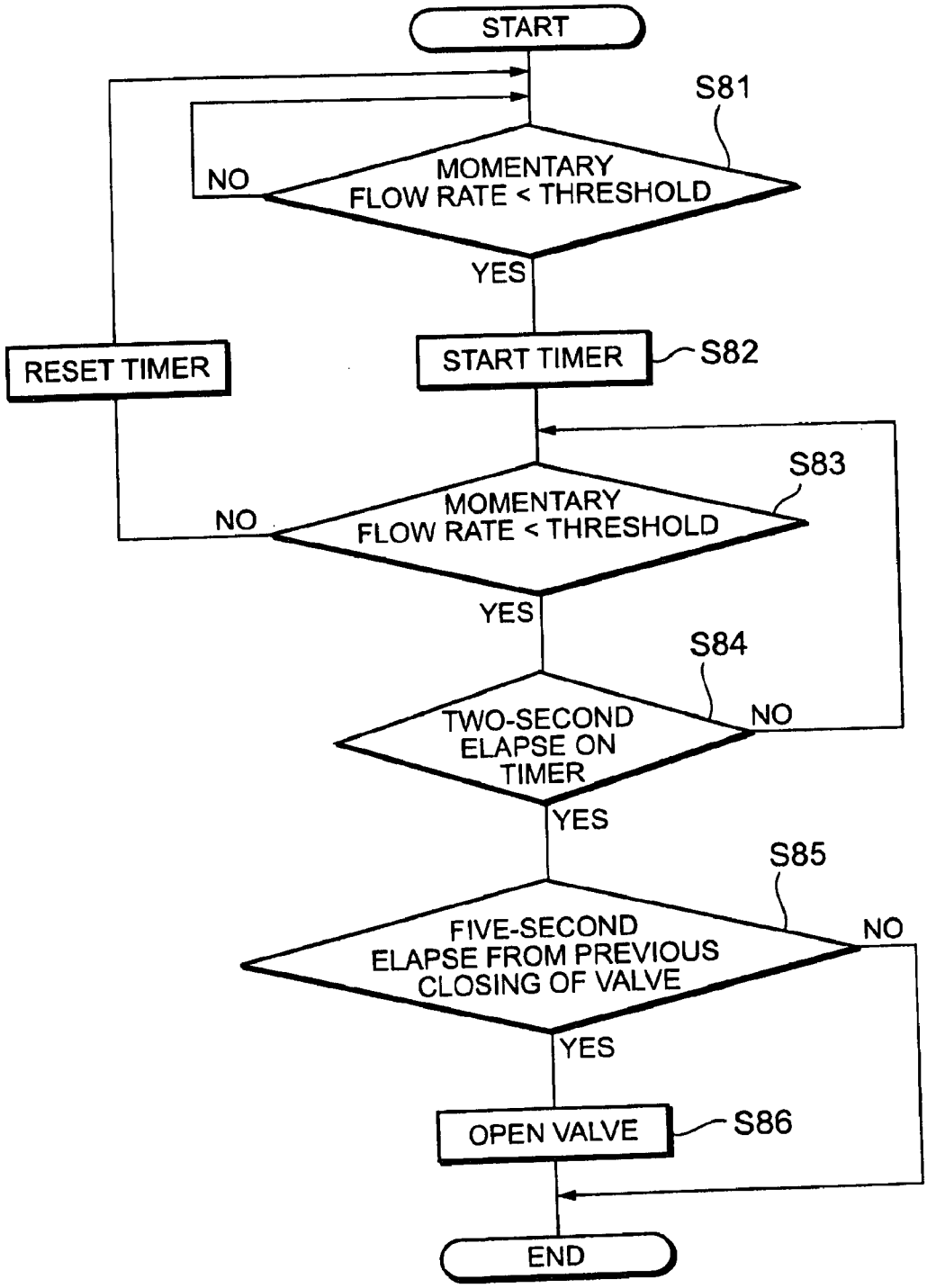
FIG. 8 is a flowchart showing an example of a method for determining reliably that urination is complete.

When a flow rate at or above a predetermined threshold is detected by the flow rate calculation portion 33, the controller 34 confirms that urination has begun. Then, in order to determine with certainty that urination is complete, the controller 34 performs the processing shown in the flowchart of FIG. 8 using the momentary flow rate calculated by the flow rate calculation portion 33. The momentary flow rate calculated every 500 ms is compared with the threshold (S81), and if the momentary flow rate is less than the threshold, a timer is started (S82). The momentary flow rate continues to be compared with the threshold (S83), and when the momentary flow rate reaches or exceeds the threshold, the timer is reset (S87) and the sequence returns to S81*.

If the momentary flow rate is less than the threshold in S83*, a determination is made as to whether or not two seconds have elapsed on the timer (S84). If two seconds have elapsed on the timer, and five seconds or more have elapsed from the previous closing of the valve, the valve is opened (S86), and if not, the sequence ends.

According to the sequence described above, cleaning is performed for the first time when the momentary flow rate is less than the threshold for two seconds or more. Further, the valve is not opened unless five seconds have elapsed since the previous closing of the valve, and hence cleaning is not repeated mistakenly when the cleaning water flow along the inner wall surface of the bowl portion is detected.

Figure 9:
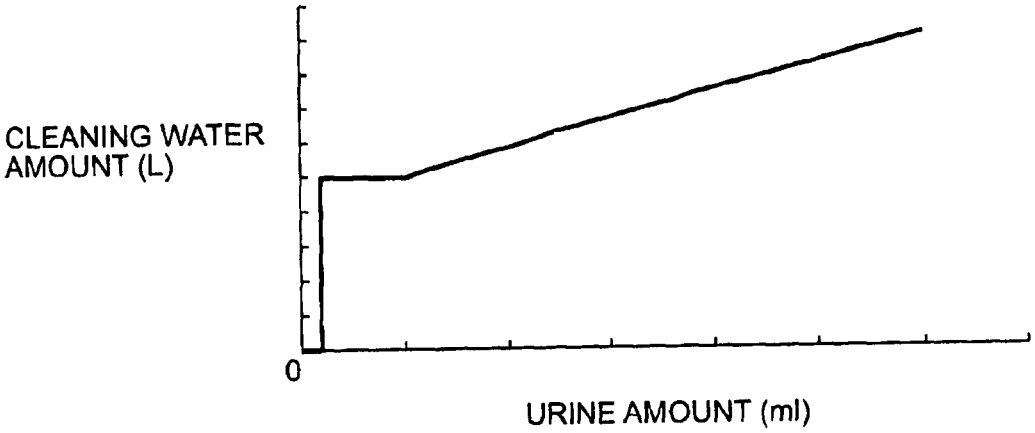
FIG. 9 is a graph showing a relationship between the quantity of urine and the quantity of cleaning water to be supplied.

Next, the timing of closure of the cleaning water supply valve 36 will be described in the following. To maintain the hygiene of the toilet stool 10 at or above a fixed standard, the quantity of cleaning water must be increased as the quantity of urine increases, and hence in this toilet cleaning device, the quantity of supplied cleaning water is set in relation to the quantity of urine as shown in the graph in FIG. 9, for example. Accordingly, the quantity of cleaning water is to be supplied is determined by integrating the momentary flow rate data shown in FIG. 7, calculating the quantity of urine, and on the basis of the quantity of urine, referring to a table which is set in advance in the controller 34.

Figure 10:
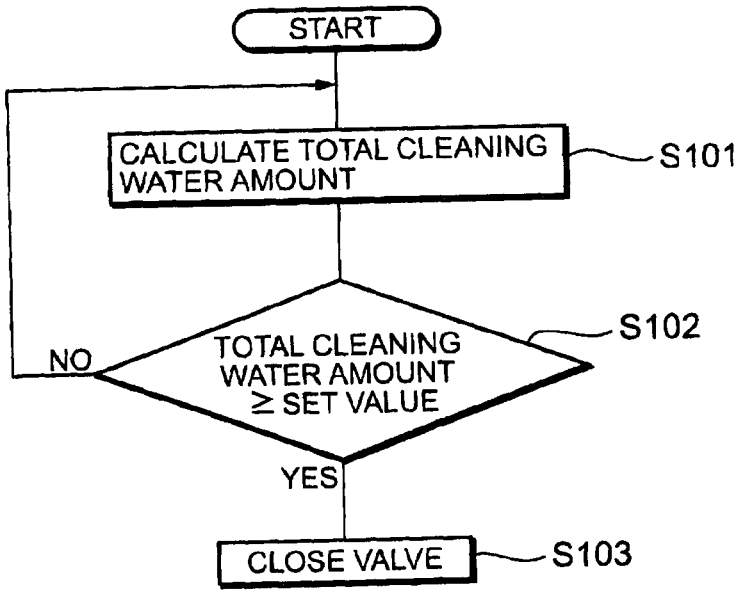
FIG. 10 is a flowchart showing a sequence up to the closure of cleaning water supply valve.

To supply the quantity of cleaning water determined in this manner, the controller 34 opens the cleaning water supply valve 36, and then closes the cleaning water supply valve 36 according to the sequence shown in the flowchart in FIG. 10. First, a frequency characteristic signal corresponding to the flow rate of the cleaning water which flows along the inner wall surface of the bowl portion is outputted from the Doppler sensor 11 in the same way for urine, and thus the momentary cleaning water flow rate is calculated in the same way for urine. However, since the surface area of the flow, the position in relation to the sensor, the state of the flow, and so on differ between urine and cleaning water, the different conversion tables for converting the frequency spectrum to the momentary flow rate are prepared individually for urine and cleaning water. By integrating the momentary flow rate (S101), the quantity of cleaning water supplied heretofore is calculated. A determination is then made as to whether this quantity of cleaning water has reached a set value (S102), and if the set value has been reached, the valve is closed (S103).

According to this sequence, when a user urinates, cleaning using an appropriate quantity of cleaning water for the quantity of urine is performed when the urination is completed with certainty, and information of the quantity of urine is outputted outside to be used for health management purposes.

Figure 11:
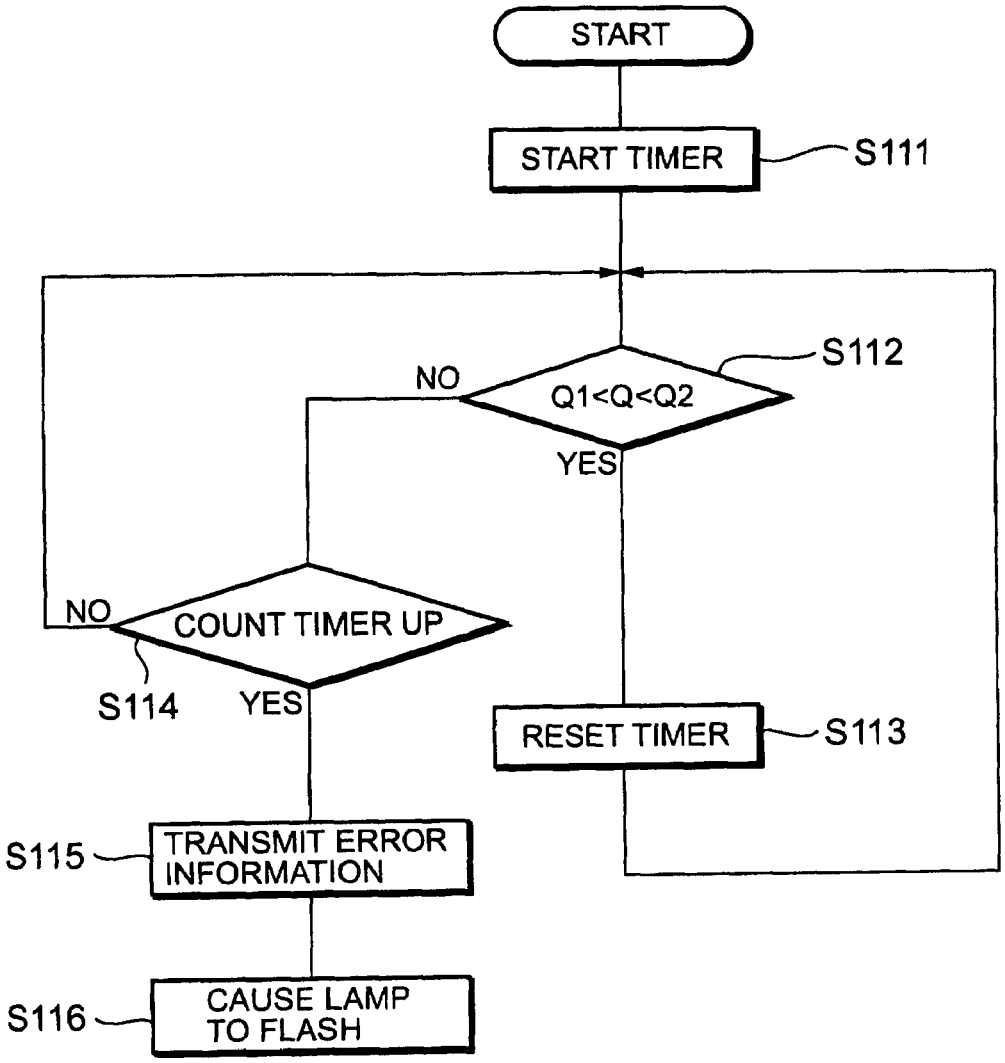
FIG. 11 is a flowchart showing an example of a method whereby a controller detects and outputs an irregularity when the cleaning water supply valve is open.

This toilet cleaning device is also capable of detecting and outputting the cleaning condition. More specifically, the device is equipped with a self-diagnosing function using the Doppler sensor 11. An example of a method whereby the controller 34 detects and outputs an irregularity when issuing an instruction to open the cleaning water supply valve 36 will now be described on the basis of the flowchart shown in FIG. 11. After opening the cleaning water supply valve 36, a timer is started (S111). Then, a determination is made as to whether or not the flow rate calculated by the flow rate calculation portion 32 is between an appropriate lower limit Q1 and an appropriate upper limit Q2 (S112). If the flow rate is within the appropriate range, the timer is reset (S113). If, on the other hand, the flow rate is outside of the appropriate range, a determination is made as to whether or not the timer has counted up (S114). If the timer has not counted up, the flow rate determination of S112* is continued. If the timer has counted up, information stating that "the flow rate has been outside of the appropriate range for at least a predetermined length of time" is outputted from the outside output interface 35 (S115), and the lamp 19 is caused to flash (S116). Note that this processing is implemented only when the cleaning water supply valve 36 is open. Further, by setting the time period for determining an irregularity sufficiently longer (two seconds, for example) than the time required for the cleaning water flow along the inner wall surface of the bowl portion to reach a steady state after the instruction issue to open the cleaning water supply valve 36, the danger of determining an irregularity immediately after opening the cleaning water supply valve 36 due to the fact that the quantity of cleaning water has not reached a steady value is eliminated.

Figure 12:
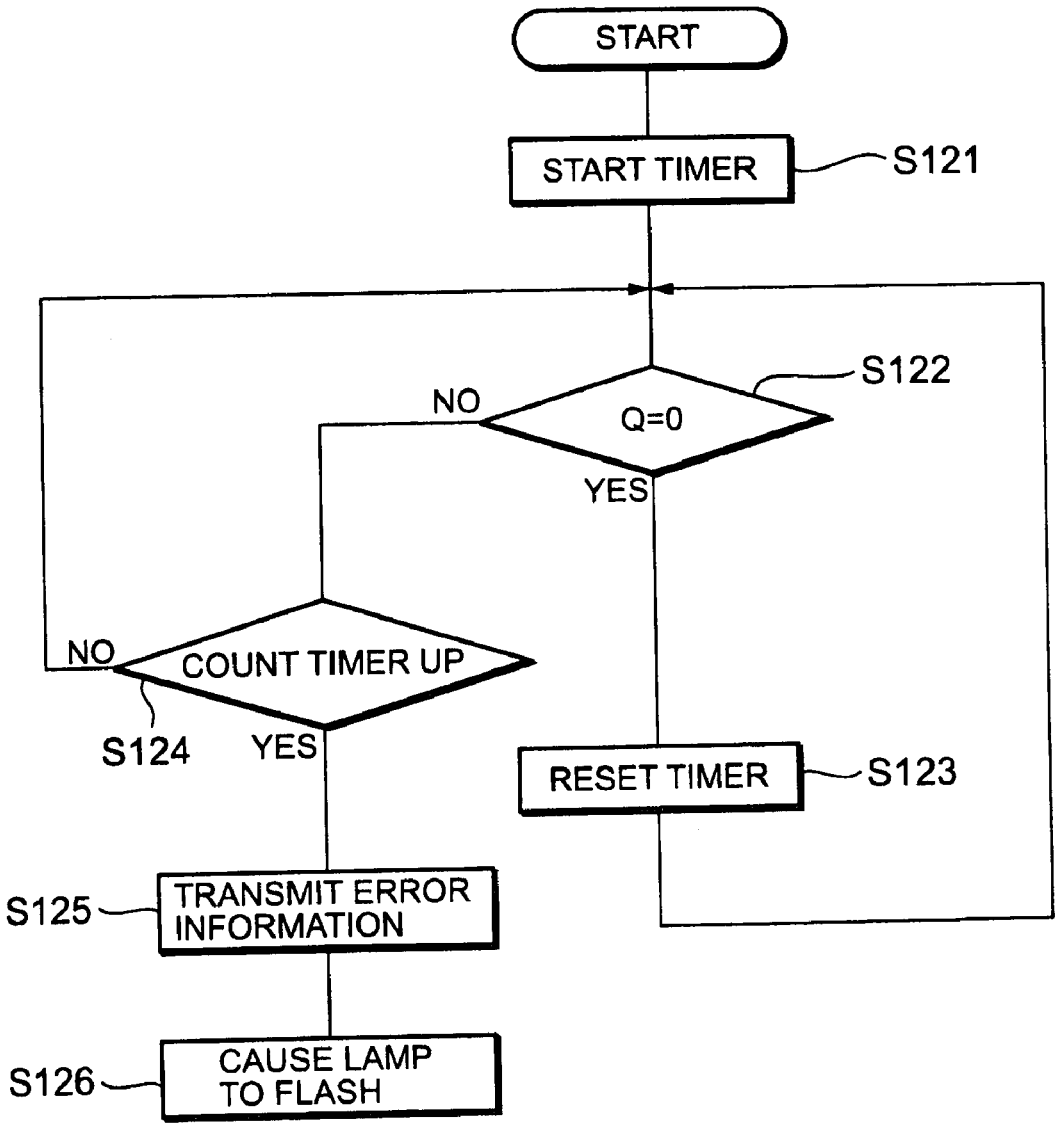
FIG. 12 is a flowchart showing an example of a method whereby a controller detects and outputs an irregularity when the cleaning water supply valve is closed.

Next, an example of a method whereby the controller 34 detects and outputs an irregularity when the cleaning water supply valve 36 is closed will be described on the basis of the flowchart shown in FIG. 12. After closing the cleaning water supply valve 36, a timer is started (S121). Then, a determination is made as to whether or not the flow rate Q calculated by the flow rate calculation portion 32 is zero (S122). If the flow rate is zero, the timer is reset (S123). If, on the other hand, the flow rate is not zero, a determination is made as to whether or not the timer has counted up (S124). If the timer has not counted up, the flow rate determination in S122 is continued. If the timer has counted up, information stating that "the flow rate has not been zero for at least a predetermined length of time" is outputted from the outside output interface 35 (S125) and the lamp 19 is caused to flash. Note that this processing is implemented only when the cleaning water supply valve 36 is closed. Further, by setting the time period for determining an irregularity sufficiently longer (three minutes, for example) than a typical urination period, the danger of determining an irregularity when urination has been detected is eliminated.

Figure 13:
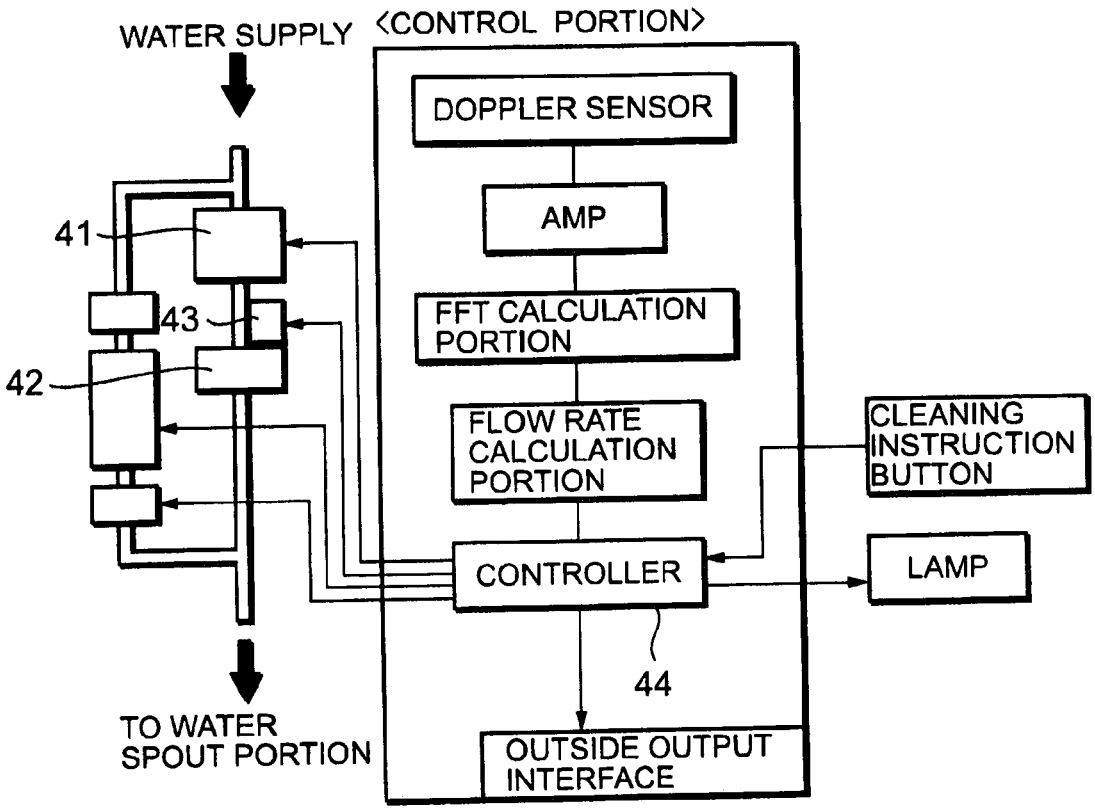
FIG. 13 is a functional block diagram showing a second constitutional example of the toilet cleaning device according to the present invention.

FIG. 13 is a view showing a second constitutional example of the toilet cleaning device according to the present invention. In addition to the constitution in FIG. 3, a flow rate adjustment valve 42 is provided downstream of cleaning water supply valve 41. The flow rate adjustment valve 42 is designed to gradually modify the opening of the flow path using opening modification means 43. The opening modification means 43 are driven by a stepping motor which operates in accordance with an instruction from a controller 44.

Figure 14:
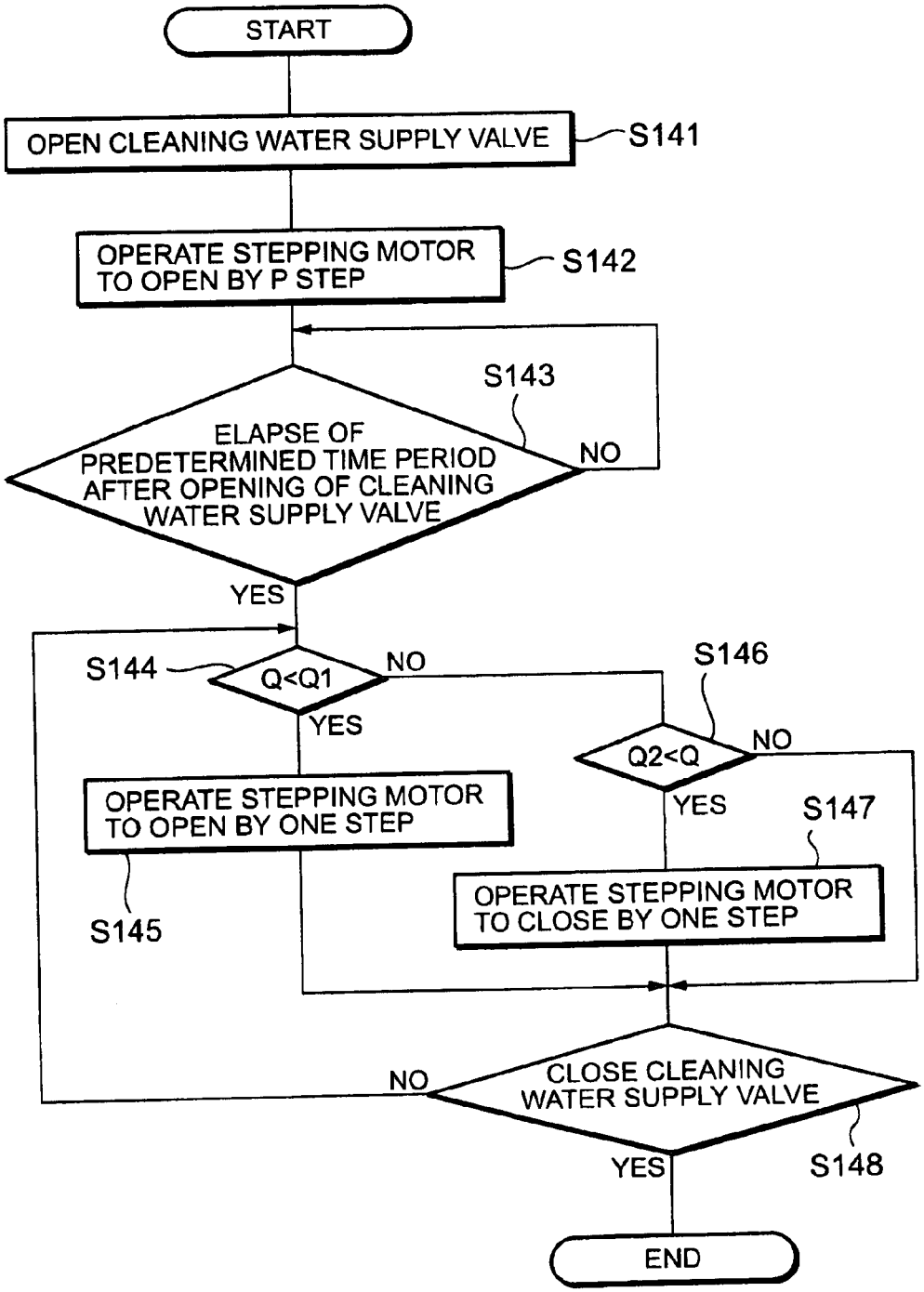
FIG. 14 is a flowchart showing a method for automatically adjusting the quantity of cleaning water flow along the inner wall surface of a bowl portion when this quantity of cleaning water is not within an appropriate range.

A method employed in the constitution described above, whereby the quantity of cleaning water is adjusted automatically when the quantity of cleaning water flowing along the inner wall surface of the bowl portion is not within the appropriate range while the controller 34 opens the cleaning water supply valve 41, will now be described on the basis of the flowchart in FIG. 14.

The cleaning water supply valve 41 is opened (S141), the stepping motor is rotated in a valve-opening direction by a predetermined P step (S142), and the elapse of a predetermined length of time is awaited (N in S143). When the predetermined length of time has elapsed (Y in S143), a determination is made as to whether or not the calculated momentary flow rate Q is smaller than the appropriate lower limit Q1 (S144). If the momentary flow rate Q is smaller than the appropriate lower limit Q1, the opening modification means 43 are caused to perform a one-step opening operation such that the flow path area of the flow rate adjustment valve 42 is increased (S145). If, on the contrary, the momentary flow rate Q is larger than the appropriate upper limit Q2 (Y in S146), the opening modification means 43 are caused to perform a one-step closing operation such that the flow path area of the flow rate adjustment valve 42 is decreased (S147). This adjustment operation is continued until a closing instruction is issued to the cleaning water supply valve 41 (S148) Here, the time period during which adjustment is not performed in S143 is set to be sufficiently longer (two seconds, for example) than the time required for the quantity of a cleaning water flowing along the inner wall surface of the bowl portion to reach a steady state following the opening of the cleaning water supply valve 41. By means of this processing, the opening of the flow rate adjustment valve 42 is maintained until the time at which the cleaning water supply valve 41 is reopened, and hence as long as there is no variation in water pressure, cleaning water is supplied at an appropriate flow rate from the beginning of the following operation.

Figure 15:
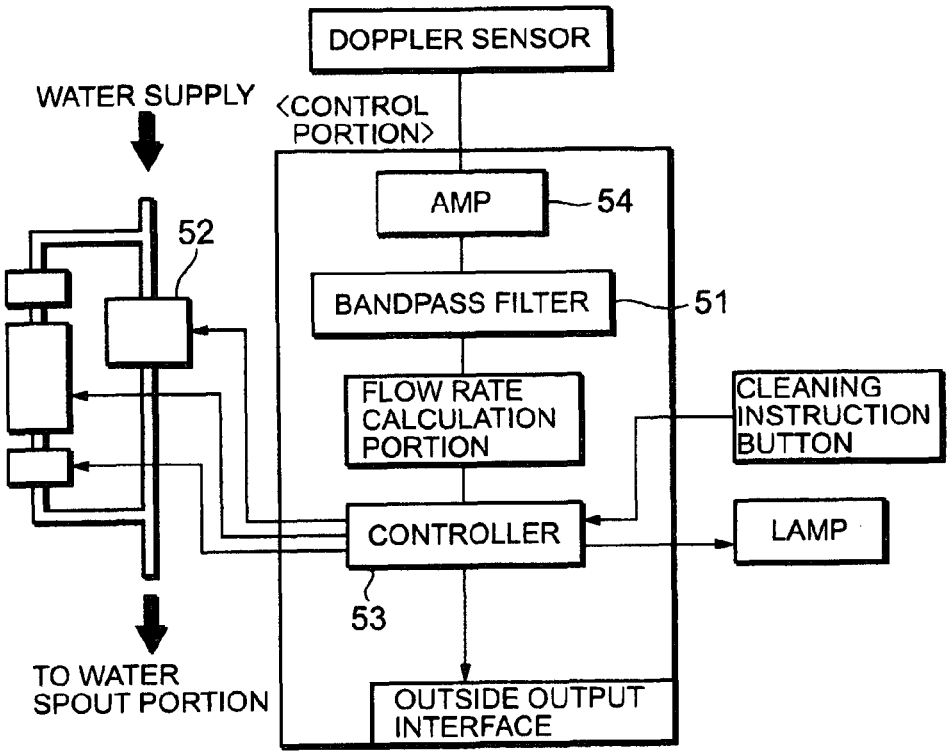
FIG. 15 is a view showing a third constitutional example of the toilet cleaning device according to the present invention.

FIG. 15 is a view showing a third constitutional example of the toilet cleaning device according to the present invention. The difference with the constitution shown in FIG. 3 lies in the employment of a bandpass filter 51 as the frequency analysis means in place of the FFT calculation means. By using the bandpass filter 51, a low-cost constitution can be obtained.

Figure 16:
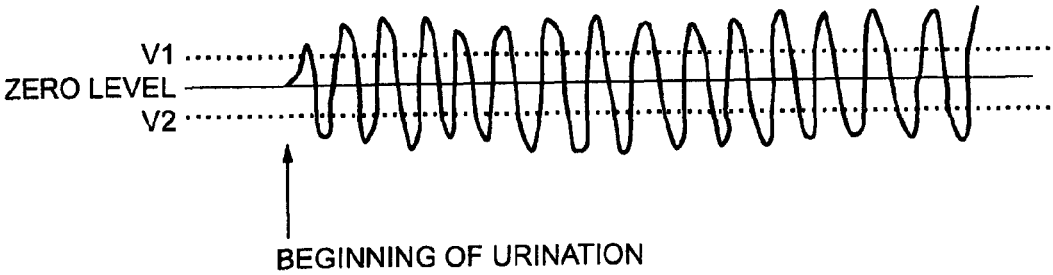
FIG. 16 is a view showing an example of an output signal from a bandpass filter.

The bandpass filter 51 sets a passband through which signal frequencies produced by urine flow pass, and thus an output signal such as that shown in FIG. 16, for example, is obtained. In FIG. 16, the output signal maintains a constant level of zero prior to the start of urination, but when urination begins, changes to a waveform which undulates above and below the zero level.

Normally, the flow velocity of urine and the flow velocity of cleaning water have similar values, and hence the output frequencies from the Doppler sensor in relation to both also take similar values. Accordingly, a substantially identical output is obtained from the bandpass filter 51 in the case of both urine flow and cleaning water flow. However, by altering the form of the cleaning water spout portion, the cleaning water flow velocity and urine flow velocity can be differentiated, enabling only urine flow to be detected by the bandpass filter 51. In so doing, urine flow can be detected even during cleaning, which is favorable since it allows urine flow to be measured accurately even in cases such as when a subsequent user urinates during cleaning performed after usage by the previous user.

Figure 33:
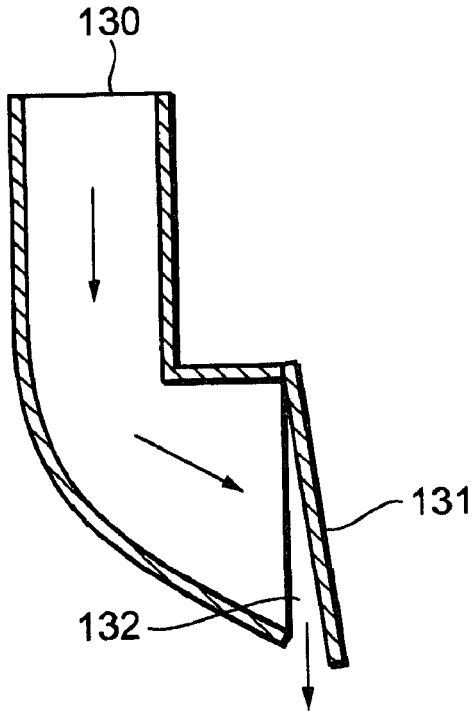
FIG. 33 is a sectional view showing an example of a water spout portion for differentiating the flow velocity of cleaning and the flow velocity of urine.
Figure 34:
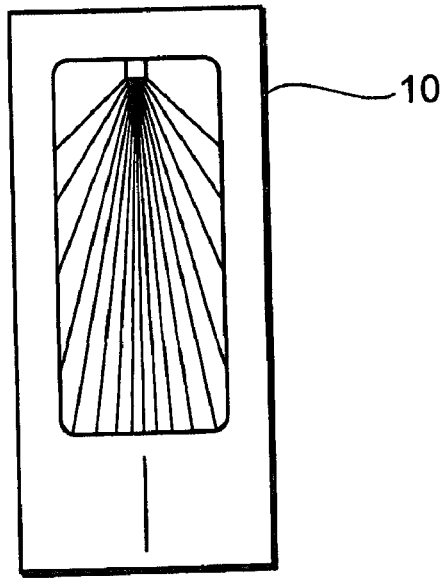
FIG. 34 is a view showing the flow of cleaning water when the water spout portion shown in FIG. 33 is used.

FIG. 33 is a sectional view showing an example of a water spout portion for differentiating the cleaning water flow velocity and the urine flow velocity. Cleaning water entering a water introduction portion 130 flows through the interior of the water spout portion main body, whereupon most of the cleaning water impinges on a discharge direction control plate 131 and is discharged from a water spout 132. Here, the water spout 132 is provided with opening portions in the left, right, and downward directions when seen from the flow of the cleaning water, and hence the cleaning water is discharged widely along the inner wall surface of the bowl portion as shown in FIG. 34. In other words, by discharging the cleaning water to the discharge direction control plate 131 such that the cleaning water is discharged from the water spout in a substantially radial form, the flow velocity of the cleaning water can be slowed, allowing the detection of urine flow even during cleaning. Note that the means for reducing the flow velocity of the cleaning water are not limited to those shown in FIG. 33.

Returning to FIG. 15, the bandpass filter 51 may be constituted by a circuit using a condenser and resistor. As an alternative constitution, a simpler constitution may be employed in which the bandpass filter 51 is a digital filter using a computing element such as a microcomputer or DSP (Digital Signal processor). More specifically, this can be realized by A/D converting the output of an amp 54 at equal time intervals, and substituting the resulting A/D value into a calculation process corresponding to the required filter characteristic.

Figure 26:
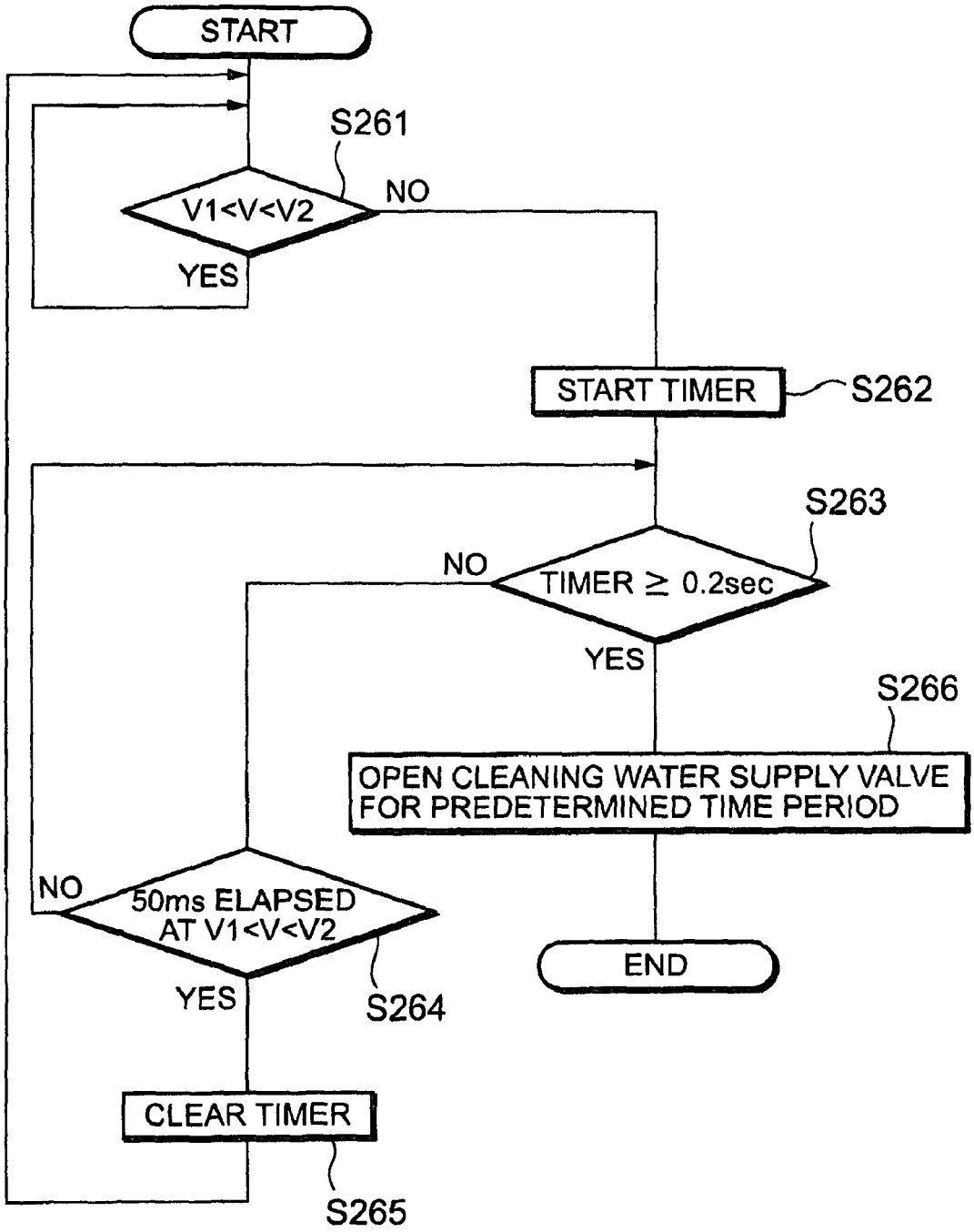
FIG. 26 is a flowchart showing a sequence for supplying cleaning water immediately after urination has begun to prevent the inner wall surface of the bowl portion from becoming stained.

Immediately before urination begins, the controller 53 forms a water film over the inner wall surface of the bowl portion by supplying cleaning water to prevent stains from becoming attached to the inner wall surface of the bowl portion. More specifically, the sequence shown in the flowchart in FIG. 26 is performed. When an output level V of the bandpass filter 51 is no higher than V1 or no lower than V2 as shown in FIG. 16 (N in S261), a timer is started (S262). When the timer reaches 0.2sec (N in S263), a determination is made as to whether or not 50 msec have passed from the output level V of the bandpass filter 51 entering the range between V1 and V2 (S264). If 50 msec have passed from the output level V of the bandpass filter 51 entering the range between V1 and V2 (Y in S264), this is considered to be noise rather than urine flow, and hence the timer is cleared (S265) and the determination as to whether the output level V of the bandpass filter 51 is no higher than V1 or no lower than V2 is repeated (S261). If, on the other hand, the timer has reached 0.2sec (Y in S263), the cleaning water supply valve 52 is opened for a predetermined length of time (S266*).

Figure 17:
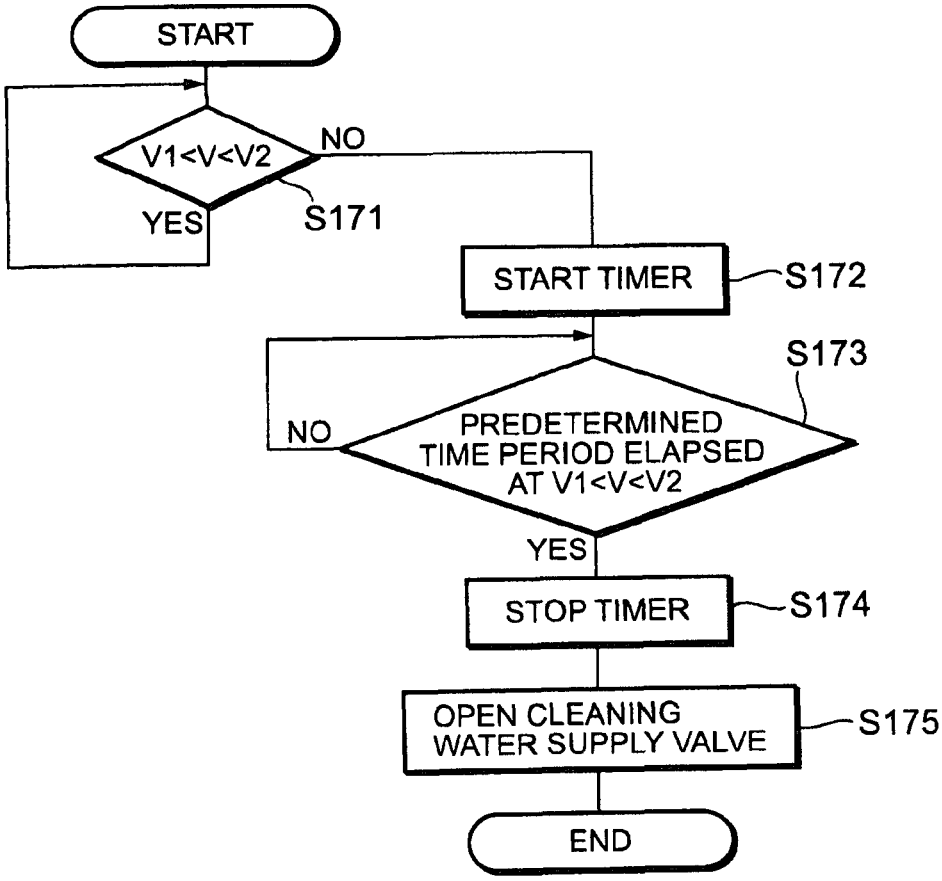
FIG. 17 is a flowchart showing a sequence up to the supply of cleaning water based on the output signal from the bandpass filter.

A sequence up to the supply of cleaning water following urination is shown in the flowchart in FIG. 17. When the output level V of the bandpass filter 51 is no higher than V1 or no lower than V2 (N in S171), a timer is started (S172). When a predetermined length of time elapses from V entering a range between V1 and V2 (Y in S173), the timer is stopped (S174) and the cleaning water supply valve 52 is opened (S175). The predetermined length of time in S173 is set to be sufficiently longer (two seconds, for example) than the time at which urination typically stops. Once this processing is complete, the timer value, or in other words the time during which urination was detected, is reflected in the quantity of cleaning water.

Figure 18:
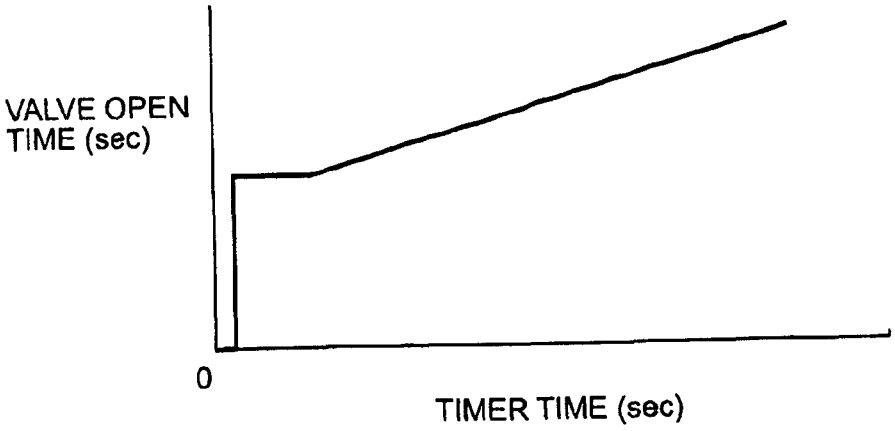
FIG. 18 is a view illustrating a table which charts the time that the cleaning water supply valve remains open from a timer value.

A table charting the time during which the cleaning water supply valve 52 is opened in relation to the timer value is preset in the controller 53 as shown in FIG. 18, and hence the controller 53 closes the cleaning water supply valve 52 after an quantity of time obtained by referring to this table has elapsed. By means of the processing described above, the quantity of cleaning water can be controlled appropriately using the tendency for the quantity of urine to increase in proportion to the duration of urination.

Figure 19:
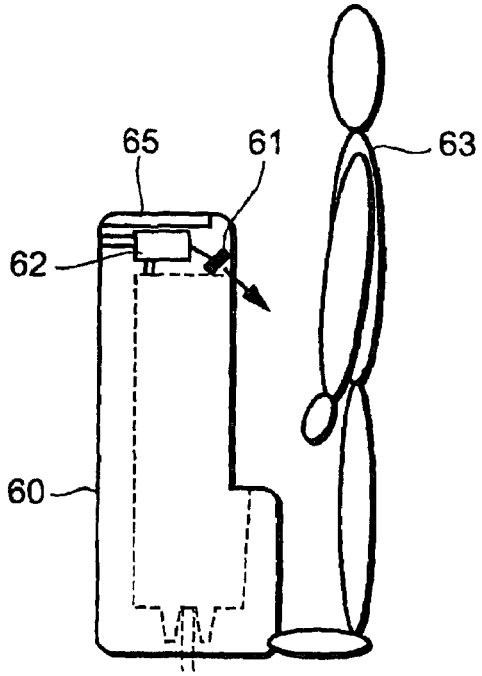
FIG. 19 is a view showing another example of the disposal of the Doppler sensor in the toilet stool.

Another example of the disposal of a Doppler sensor in a toilet stool will now be described on the basis of the drawing in FIG. 19. A Doppler sensor 61 and function portion 62 are installed in the interior of a toilet stool 60. A lid 65 is provided on the upper end of the toilet stool 60, facilitating maintenance work of the space in which the Doppler sensor 61 and function portion 62 are stored. The flow of cleaning water through the toilet stool 60 is identical to that in the first example. The Doppler sensor 61 is disposed using an anchor such that radio waves are transmitted toward the user, and hence user signals and signals of the urine released by the user can be obtained at a high S/N ratio and low distortion.

Figure 20:
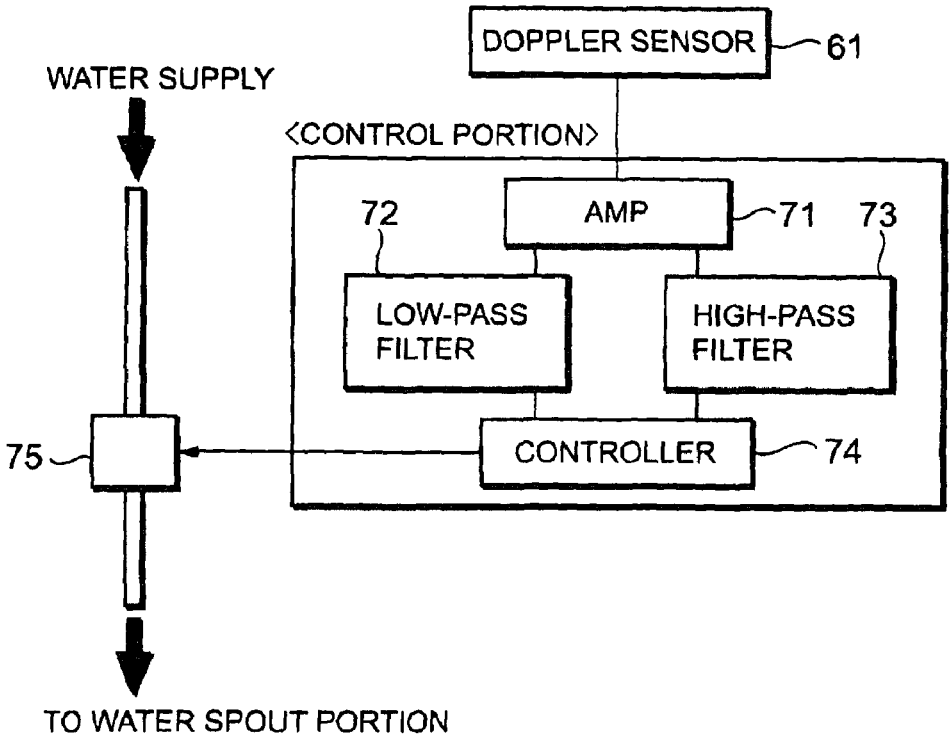
FIG. 20 is a view showing the constitution of a function portion.

The function portion 62 is constituted as shown in FIG. 20. The output of the Doppler sensor 61 is amplified by an amp 71, and outputted respectively to a low-pass filter 72 which passes signals of less than 50 Hz and a high-pass filter 73 which passes signals of between 100 and 500 Hz. A controller 74 operates cleaning water supply valve 75 on the basis of the output of the low-pass filter 72 and high-pass filter 73.

In the toilet stool constituted as described above, when a user approaches the toilet stool 60 or a user moves away from the toilet stool 60, signals are outputted mainly from the low-pass filter 72. On the other hand, the velocity of urine flow is faster than that of a human body, and hence during urination signals are mainly outputted from the high-pass filter 73. Thus the controller 74 is able to distinguish between human movement and urine flow.

Figure 21:
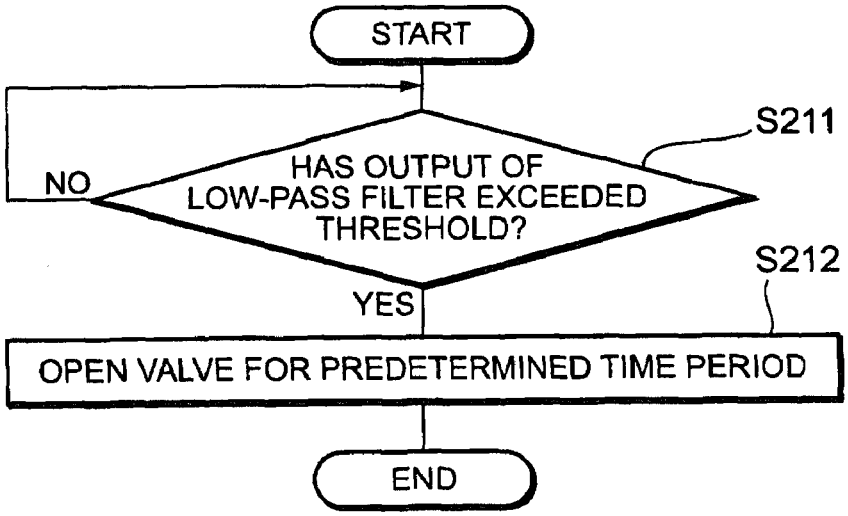
FIG. 21 is a flowchart showing an example of a method for controlling the cleaning water supply valve.

A method of controlling the cleaning water supply valve 75 will be described on the basis of the flowchart in FIG. 21. The controller 74 determines the presence or absence of a user on the basis of the output of the low-pass filter 72 and high-pass filter 73. When it is determined that no user is present, the processing shown in the flowchart in FIG. 21 is performed. That is, when the output of the low-pass filter 72 exceeds a threshold (Y in S211), the cleaning water supply valve 75 is opened for a predetermined length of time (S212). Note that the above processing is performed continuously while the cleaning water supply valve 75 is closed. By means of this processing, a water film can be formed over the inner wall surface of the bowl portion prior to urination when a user approaches the toilet stool 60, and thus stains can be removed easily.

Figure 22:
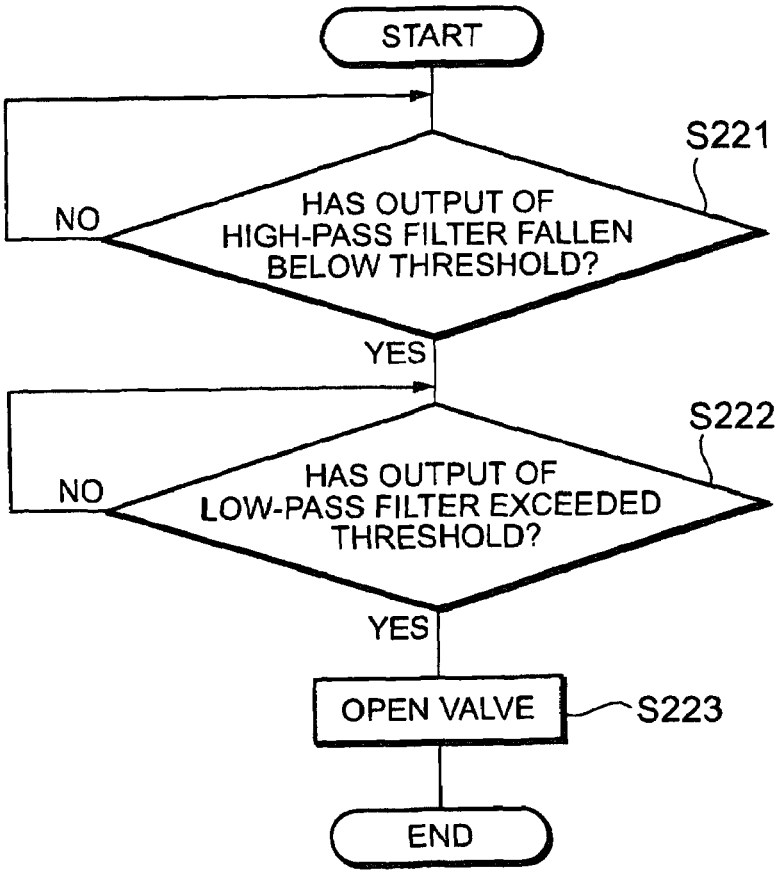
FIG. 22 is a flowchart showing an example of a processing method up to the opening of the cleaning water supply valve following urination.

The controller 74 determines the start of urination when the output of the high-pass filter 73 reaches or exceeds a predetermined threshold while cleaning water is not being supplied. Next, in order to determine with certainty that urination is complete, the controller 74 performs the processing shown in the flowchart in FIG. 22. The output of the high-pass filter 73 equals or exceeds a threshold during urination (N in S221), but falls below the threshold when urination is complete (Y in S221). Next, the output of the low-pass filter 72 does not exceed a threshold until the user moves away (N in S222), but when the user moves away, the output of the low-pass filter 72 exceeds the threshold (Y in S222) and the valve is opened (S223).

The timing for closing the cleaning water supply valve 75 can be set appropriately in accordance with the duration of urination similarly to the example described previously. Further, the flow rate can be confirmed with accuracy by performing FFT calculation instead of using a bandpass filter.

Figure 27:
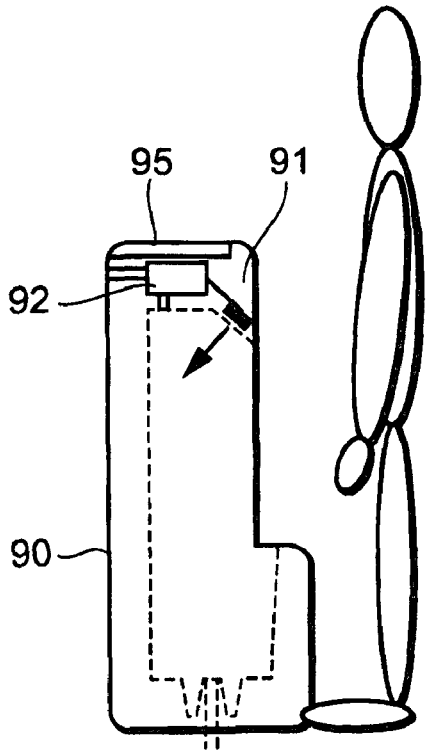
FIG. 27 is a view showing an outline of another example of the disposal of the Doppler sensor in the toilet stool.

Another example of the disposal of a Doppler sensor in a toilet stool will now be described. FIG. 27 shows an outline thereof. A Doppler sensor 91 and a function portion 92 are installed in the upper interior of a toilet stool 90. A lid 95 is provided on the upper end of the toilet stool 90, facilitating maintenance work of the space in which the Doppler sensor 91 and function portion 92 are stored. The flow of cleaning water through the toilet stool 90 is identical to that in the previous examples. In order to detect urine flow with even more certainty, the Doppler sensor 91 is disposed such that radio waves are transmitted toward a parallel direction to the direction of urine flow in the vast majority of cases, or in other words inclined downward, and hence signals of the urine released by a user can be obtained at a high S/N ratio and low distortion.

Figure 28:
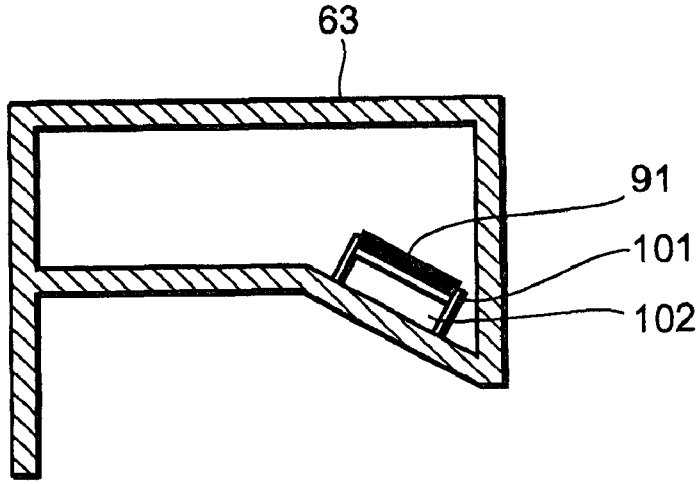
FIG. 28 is a sectional view of an upper portion of the toilet stool shown in FIG. 27.

FIG. 28 is a sectional view of the upper portion of the toilet stool 90. The Doppler sensor 91 is disposed using a spacer 101 such that the inner surface of the toilet stool 90 is orthogonal to the transmission direction. Further, a reflection prevention plate 102 made of an ABS resin having a relative permittivity of approximately three and a relative permeability of approximately one is disposed using an anchor and in close contact with the inner surface of the toilet stool 90 at the part through which radio waves transmitted from the Doppler sensor 91 pass.

Radio waves of 10.525 GHz, for example, are transmitted from the Doppler sensor 91. The radio waves transmitted by the Doppler sensor 91 propagate through the air existing within the gap between the Doppler sensor 91 and the reflection prevention plate 102, pass through the reflection prevention plate 102, and then progress to the earthenware inner wall of the toilet stool 90. Here, the atmospheric wave impedance $Z_0$ is $Z_0=\sqrt{(\epsilon_0/\mu_0)}$. The relative permittivity of the earthenware is approximately nine, and hence the wave impedance $Z_2$ of the earthenware inner wall of the toilet stool 90 is $Z_2\approx\sqrt{(9\epsilon_0/\mu_0)}$. The wave impedance $Z_1$ of the reflection prevention plate 102 is $Z_1\approx\sqrt{(3\epsilon_0/\mu_0)}$.

Since $\sqrt{(Z_0\times Z_2)}\approx\sqrt{\{\sqrt{(\epsilon_0/\mu_0)}\times\sqrt{(9\epsilon_0/\mu_0)}\}}=\sqrt{(3\epsilon_0/\mu_0)}$, a relationship of reflection prevention plate 102 wave impedance $Z_1\approx\sqrt{(Z_0\times Z_2)}$ is satisfied. Here, $\epsilon_0$ indicates the permittivity of a vacuum, and $\mu_0$ indicates the permeability of a vacuum.

Further, by setting the thickness of the reflection prevention plate 102 to $1/(4f\sqrt{(\epsilon\mu)})=1/(4f\sqrt{(3\times\epsilon_0\mu_0)})=1/(4\times10.525\times10^9\times\sqrt{(3\times8.854\times10^{-12}\times4\pi\times10^{-7})})\approx4.1$ mm, matching wave impedance is obtained in the radio waves transmitted from the Doppler sensor 91 with the earthenware inner wall of the toilet stool 90. As a result, reflection, which is a cause of reduced sensitivity, can be prevented. Note that by providing another reflection prevention plate on the bowl portion side of the toilet stool 90, reflection on the inner wall surface of the bowl portion can be further prevented.

Note that the material for the reflection prevention plate is not limited to the ABS resin described above, and any material having a relative permittivity of approximately three and a relative permeability of approximately one may be used. For example, polycarbonate resin, polyphenylene ether resin, polybutylene terephthalate resin, and so on may be used.

Figure 23:
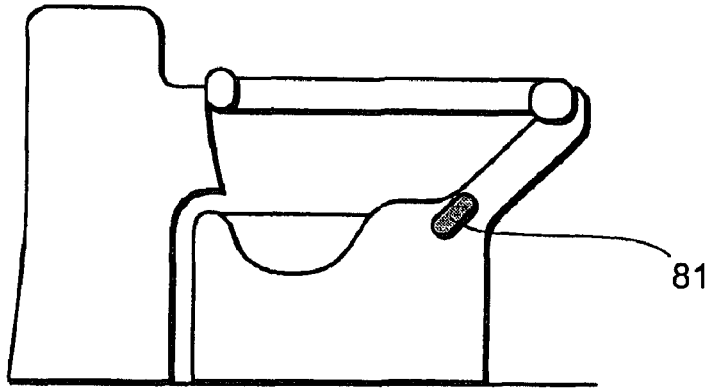
FIG. 23 is a view showing an example of Doppler sensor disposal when the toilet cleaning device is applied to a water closet.
Figure 24:
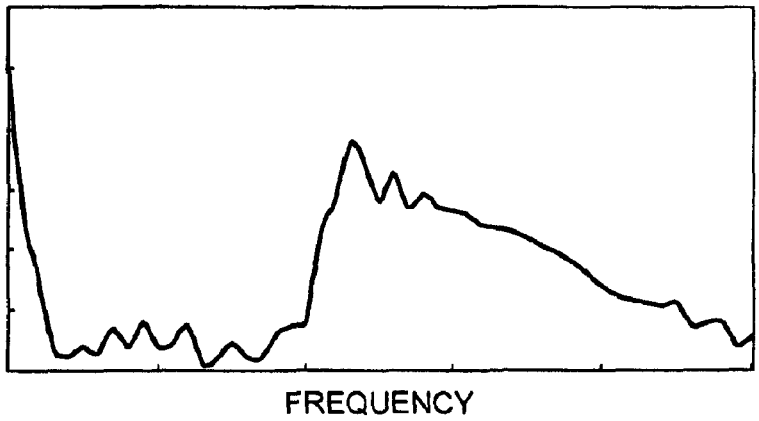
FIG. 24 is a graph showing a frequency spectrum of the output of the Doppler sensor in relation to water flow.
Figure 25:
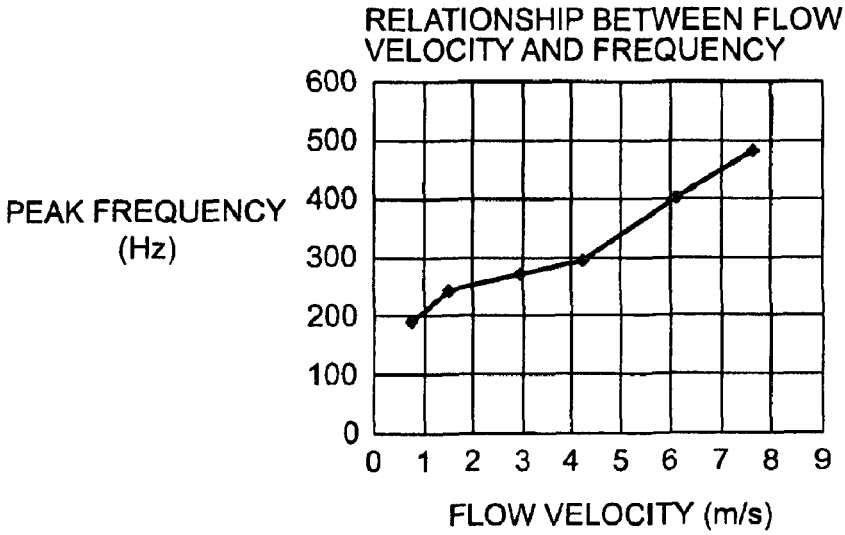
FIG. 25 is a graph showing a relationship between the peak frequency in the frequency spectrum and the flow velocity.

Up to this point, application to a toilet stool has been described. However, the present invention may be applied similarly to a water closet. For example, by disposing a Doppler sensor 81 on the inside of the lower portion of an earthenware water closet as shown in FIG. 23 such that radio waves are transmitted upward, cleaning control and so on can be activated upon detection of a user or urine flow.

Figure 29:
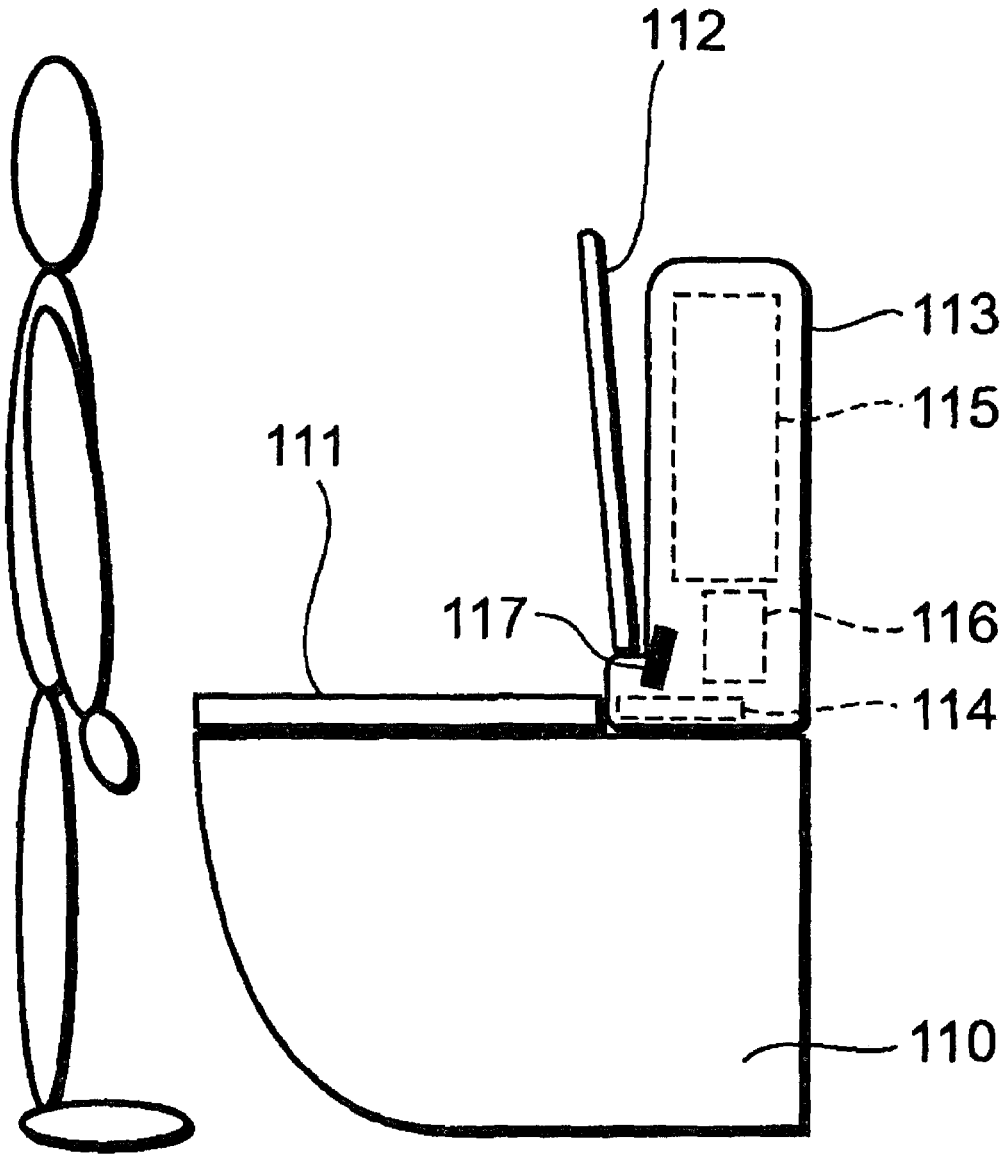
FIG. 29 is a view showing an example in which the present invention is applied to a multifunctional water closet system.

The present invention may also be applied to a multifunctional water closet system. FIG. 29 shows an example thereof in which a water closet 110 is provided with a toilet seat 111, a toilet lid 112, and a tank storage case 113. Localized washing means 114, cleaning water tank 115, a function portion 116, and a Doppler sensor 117 are provided respectively in the tank storage case 113. The Doppler sensor 117 is disposed such that radio waves are transmitted in a forward direction from the water closet 110, and hence both the presence of a user and a flow of urine from the user can be detected by a single Doppler sensor 117.

Figure 30:
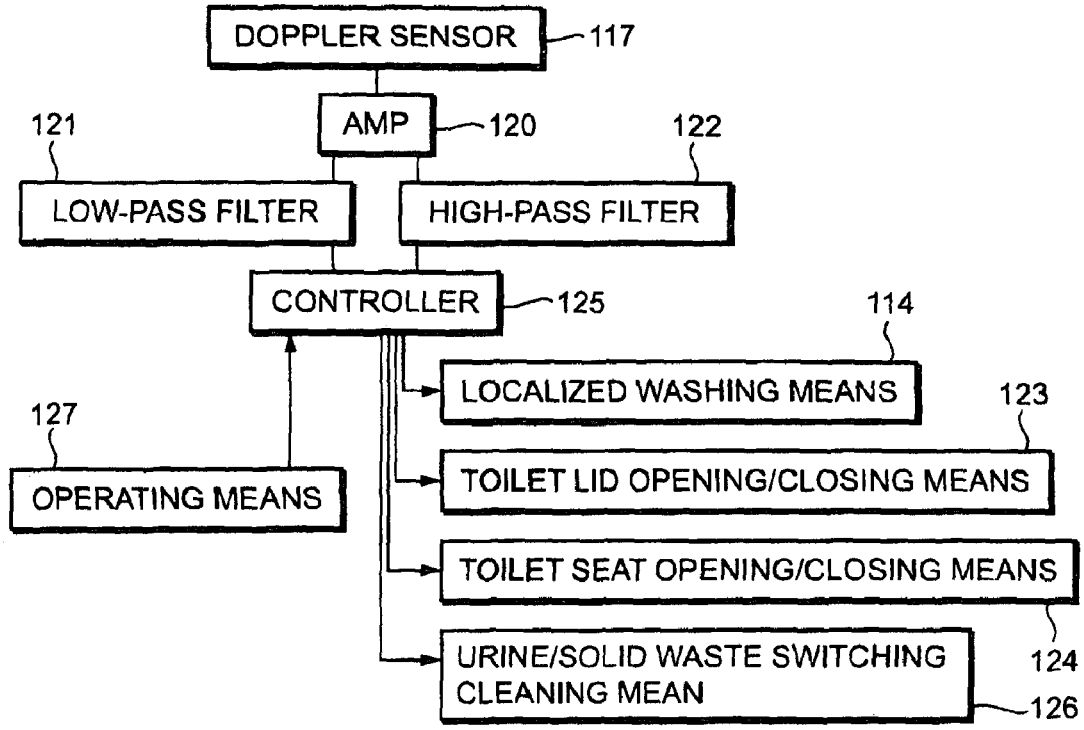
FIG. 30 is a view showing the constitution of a function portion of the multifunctional water closet system.

The constitution of the function portion 116 is shown in FIG. 30. The output of the Doppler sensor 117 is amplified by an amp 120, and outputted respectively to a low-pass filter 121 which passes signals of less than 50 Hz and a high-pass filter 122 which passes signals of between 100 and 200 Hz. Toilet lid opening/closing means 123 open and close the toilet lid 112 in accordance with an instruction from a controller 125. Toilet seat opening/closing means 124 open and close the toilet seat 111 in accordance with an instruction from the controller 125. The localized washing means 114 discharge hot and cold water to a localized area of the user sitting on the toilet seat in accordance with an instruction from the controller 125. Urination/solid waste switching cleaning means 126 differentiate the quantity of cleaning water into two levels according to whether urine or solid waste has been passed, and thus supply cleaning water from the tank 115 to the water closet 110. The localized washing means 114, toilet seat opening/closing means 124, toilet lid opening/closing means 123, and urination/solid waste switching cleaning means 126 can be operated by a user manipulating operating means 127.

In the water closet system constituted as described above, when the user approaches or moves away from the water closet 110, signals are mainly outputted from the low-pass filter 121. On the other hand, the velocity of urine flow is faster than that of a human body, and hence during urination signals are mainly outputted from the high-pass filter 122. Thus the controller 74 is able to distinguish between human movement and urine flow.

Figure 31:
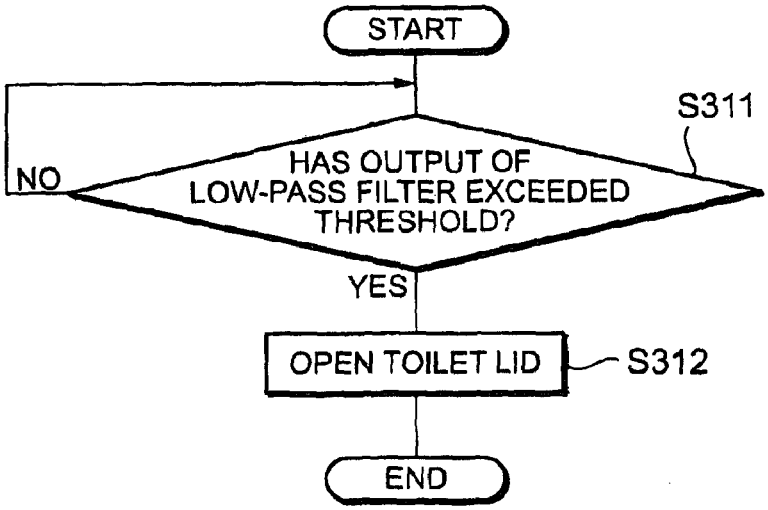
FIG. 31 is a flowchart showing an example of a method for controlling toilet lid opening/closing means, toilet seat opening/closing means, and means for switching between urine and solid waste cleaning.

An example of a method for controlling the toilet lid opening/closing means 123, toilet seat opening/closing means 124, and urination/solid waste switching cleaning means 126 will now be described on the basis of the flowchart in FIG. 31. The controller 125 determines the presence or absence of a user on the basis of the output of the low-pass filter 121. If it is determined that no user is present, the processing shown in the flowchart in FIG. 31 is performed. That is, when the output of the low-pass filter 121 exceeds a threshold (Y in S311), the toilet lid opening/closing means 123 are operated to open the toilet lid 112 (S312). By means of this processing, the toilet lid 112 is opened automatically when a user approaches, and hence the user can be relieved of labor.

Figure 32:
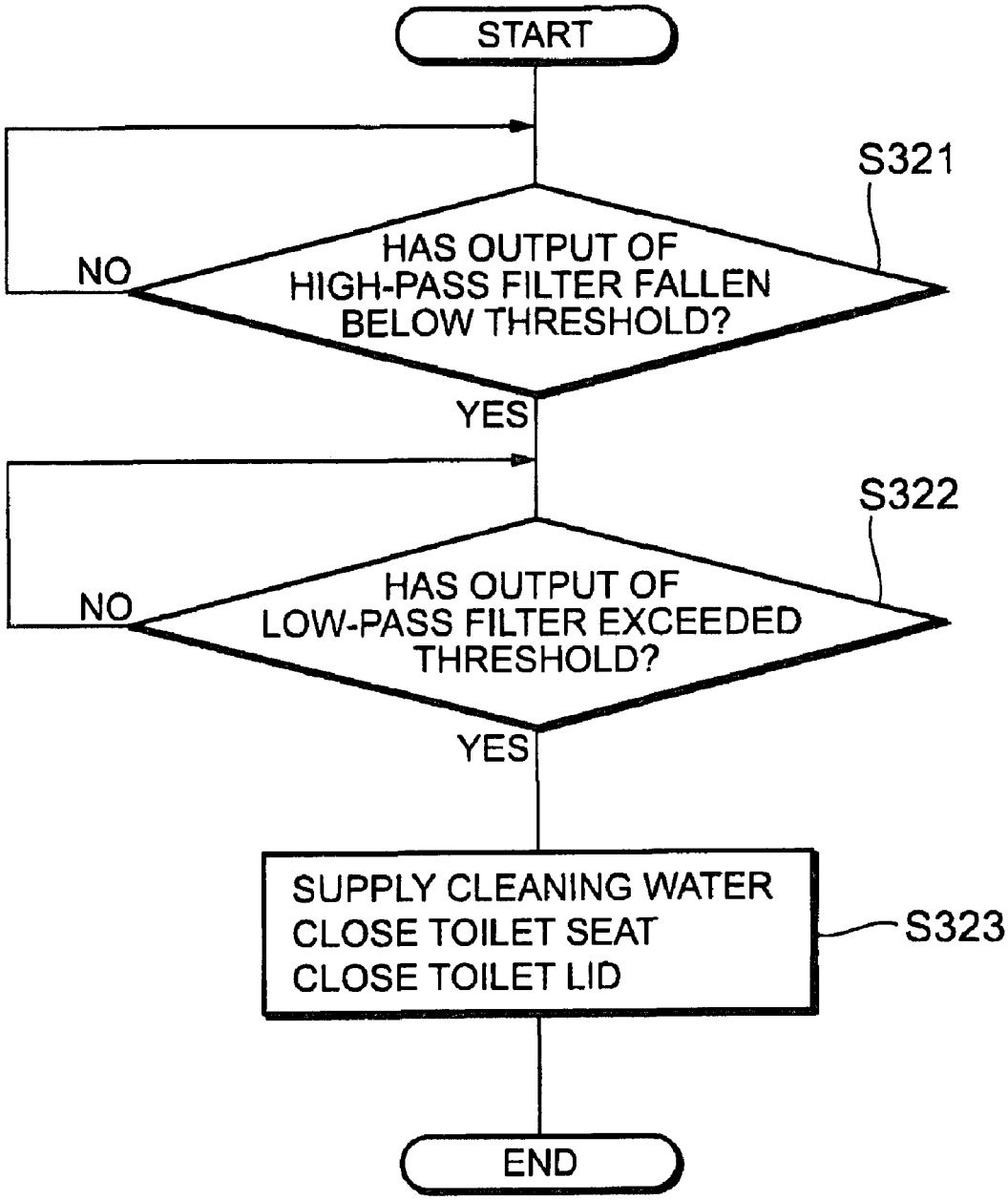
FIG. 32 is a flowchart showing an example of a method for controlling the toilet lid opening/closing means, toilet seat opening/closing means, and means for switching between urine and solid waste cleaning following urination.

Next, when the user urinates, the controller 125 determines the beginning of urination when the output of the high-pass filter 122 equals or exceeds a predetermined threshold. To determine with certainty that urination is complete, the controller 125 then performs the processing shown in the flowchart in FIG. 32. The output of the high-pass filter 122 equals or exceeds a threshold during urination (N in S321), but falls below the threshold when urination is complete (Y in S321). Next, the output of the low-pass filter 121 does not exceeds a threshold until the user moves away (N in S322), but when the user moves away, the output of the low-pass filter 122 exceeds the threshold (Y in S322), whereupon cleaning water for rinsing urine away is supplied from the urination/solid waste switching cleaning means 126, and the toilet lid opening/closing means 123 and toilet seat opening/closing means 124 are operated to close the toilet lid 112 and toilet seat 111 (S323*).

The timing for closing the cleaning water supply valve can be set appropriately in accordance with the duration of urination similarly to the examples described previously. Further, the flow rate can be confirmed with accuracy by performing FFT calculation instead of using a bandpass filter.

Next, a method for detecting the duration of urination from the beginning to the end of urination and detecting the approach and departure of a user by processing signals from the Doppler sensor using a bandpass filter will be described with reference to FIGS. 35 and 36.

Figure 35:
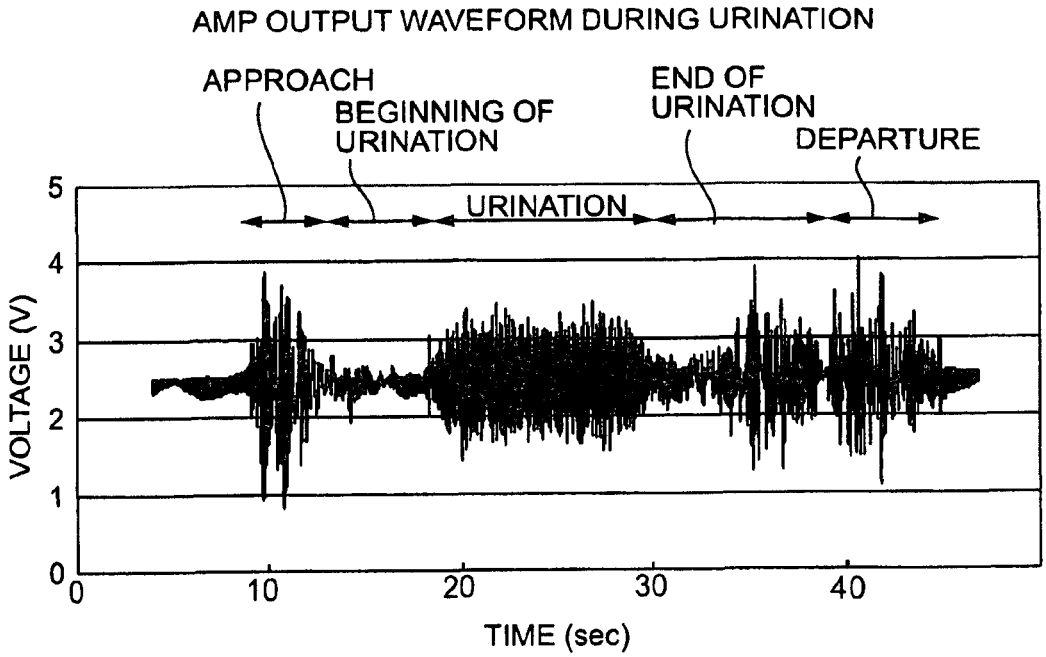
FIG. 35 is a waveform chart showing a waveform amplifying the output of the Doppler sensor during urination.

FIG. 35 is a waveform chart showing an output signal from a Doppler sensor. When a user moves toward the toilet stool, an output waveform with a comparatively large amplitude is obtained. When the user stops in front of the toilet stool and begins to prepare to urinate, the amplitude decreases. When urination begins, a waveform with a comparatively stable amplitude corresponding to the urine flow velocity is outputted. When the user finishes urinating and begins dressing, a waveform which corresponds to the movements of the user is obtained. Finally, when the user moves away from the toilet stool, a waveform with a comparatively large amplitude corresponding to the velocity at which the user moves away from the toilet stool is obtained.

Figure 36:
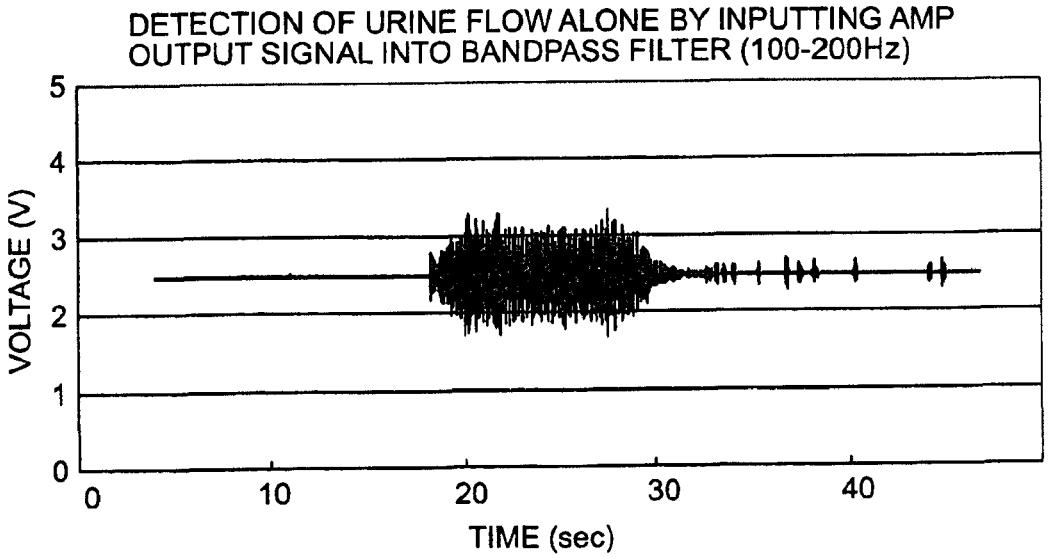
FIG. 36 is a waveform chart showing a condition in which the amp waveform during urination is processed by a high-pass filter such that only urine flow is detected.

Accordingly, if a high-pass filter which passes frequencies of between 100 and 200 Hz, for example, is used as shown in FIG. 36, a waveform of the urination period alone can be extracted from the output waveform shown in FIG. 35. By totaling the preset momentary flow rate for the detected urination period as described above, the urination quantity of the user can be calculated, and an quantity of cleaning water corresponding to the quantity of urine can be supplied such that the toilet stool is cleaned effectively and without waste.

Figure 37:
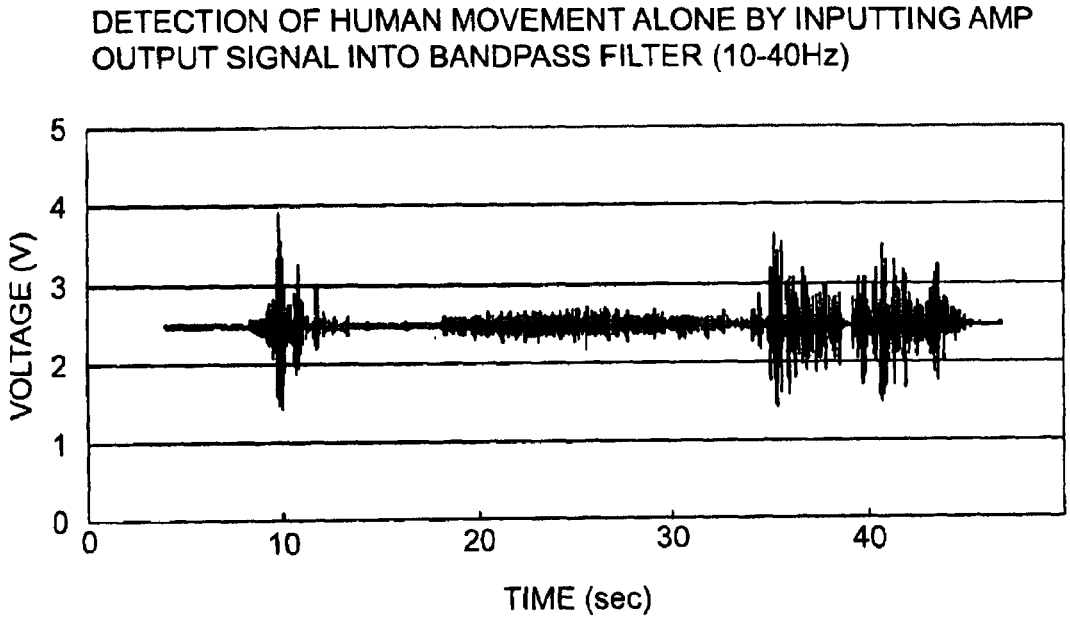
FIG. 37 is a waveform chart showing a condition in which the amp waveform during urination is processed by a low-pass filter such that only human movement is detected.

FIG. 37 is a waveform chart showing a case in which a low-pass filter which passes frequencies of between 10 and 40 Hz, for example, is used. By using a low-pass filter, the movements of the user alone can be detected from the waveform shown in FIG. 35. Accordingly, the movements of a user who has come to urinate and the departure of the user from the toilet stool after urination is complete can be detected. Moreover, a water film can be formed inside the toilet stool by supplying a small quantity of cleaning water in advance at the same time as the user nears the toilet stool, directly before urination, or at the same time as urination begins, for example.

Figure 38:
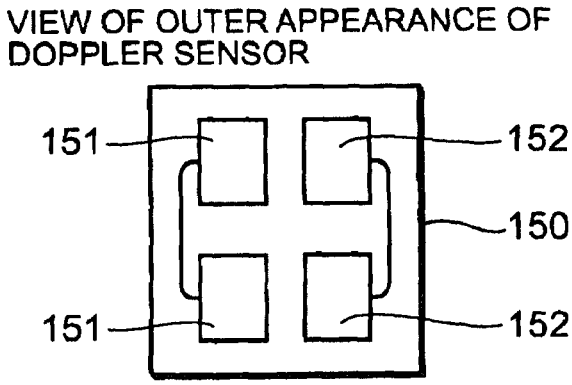
FIG. 38 is a view showing the outer appearance of the Doppler sensor.

Next, FIG. 38 is a view showing an outline of the outer appearance of a Doppler sensor. The Doppler sensor comprises two transmission antennas 151 and two reception antennas 152. The set of two transmission antennas 151 and two reception antennas 152 are provided on a detection surface 150 of the Doppler sensor opposite each other. Note that this is one example of a Doppler sensor and the present invention is not limited thereto. Three or more transmission antennas and reception antennas may be provided, or the number of antennas may differ on the transmission side and reception side such that two transmission antennas and four reception antennas, for example, are provided.

Figure 39:
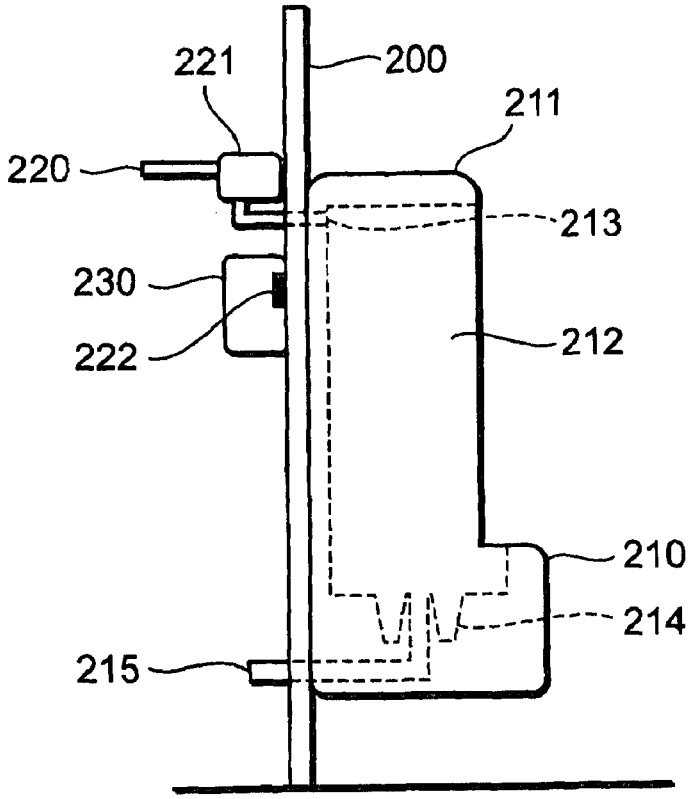
FIG. 39 is an illustrative view showing a specific example of a Doppler sensor attached to the exterior of a toilet stool.

Next, several specific examples of Doppler sensor mounting methods will be described. First, in the example shown in FIG. 39, a Doppler sensor 222 is provided on the back surface side of a panel 200 to which a toilet stool 210 is attached.

A toilet main body 211 of the toilet stool 210 is attached to the panel 200. A bowl portion 212 into which a user urinates opens widely on the front face of the toilet main body 211. A water spout 213 is provided on the upper side of the toilet main body 211 for discharging and supplying cleaning water into the bowl portion 212, and a trap portion 214 in which cleaning water and urine gather temporarily and a drain 215 for draining the cleaning water and urine are provided on the lower side of the toilet main body 211.

Next, focusing on the back surface side of the toilet main body 211, a water supply portion 220 for supplying cleaning water to the water spout 213 and cleaning water supply valve 221 for controlling the water supply from the water supply portion 220 by opening and closing are provided on the upper side of the rear surface of the panel 200 which is positioned on the back surface side of the toilet main body 211. Note that an electrolyzed water generating portion, an electrolyzed water supply valve, and so on are also provided, but have been omitted from the drawing.

A control portion 230 is provided on the rear surface side of the panel 200 so as to be positioned above the bowl portion 212. The Doppler sensor 222 is mounted so as to face the substantial direction of the user through the panel 200 and toilet main body 211.

Radio waves transmitted from the Doppler sensor 222 pass through the panel 200 and toilet main body 211 to reach the bowl portion 212, and are reflected by the liquid (cleaning water or urine flow) inside the bowl portion. The reflected radio waves pass back through the toilet main body 211 and panel 200 and are received in the Doppler sensor 222.

Thus even when the Doppler sensor 222 is provided on the rear side of the toilet main body 211, a flow of cleaning water or urine and the movements of a user can be detected without contact. Furthermore, since the Doppler sensor 222 is provided on the back surface side on the exterior of the toilet main body 211 rather than in the interior of the toilet main body 211, the structure of the toilet main body 211 can be simplified and the Doppler sensor 222 can be removed from the cleaning water and urine, thus preventing deterioration or the like caused by moisture, ammonia, and so on.

Figure 40:
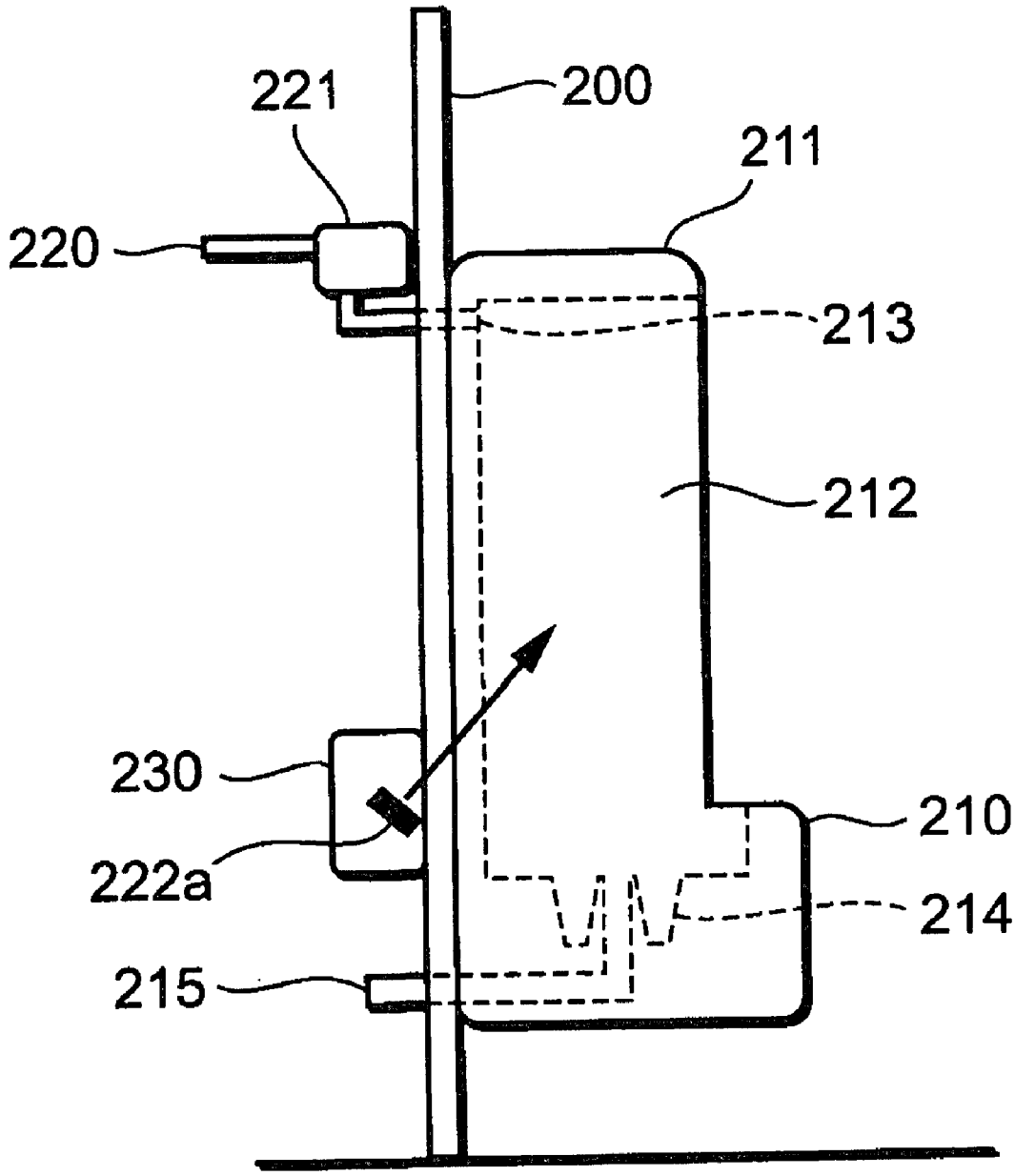
FIG. 40 is an illustrative view showing another specific example of a Doppler sensor attached to the exterior of a toilet stool.

Next, FIG. 40 shows another example of Doppler sensor mounting. In this example, a control portion 230a and a Doppler sensor 222a are positioned below the bowl portion 212 and mounted on the rear surface side of the panel 200.

The Doppler sensor 222a is provided so as to transmit and receive radio waves at an upward incline from the lower side of the bowl portion 212.

Figure 41:
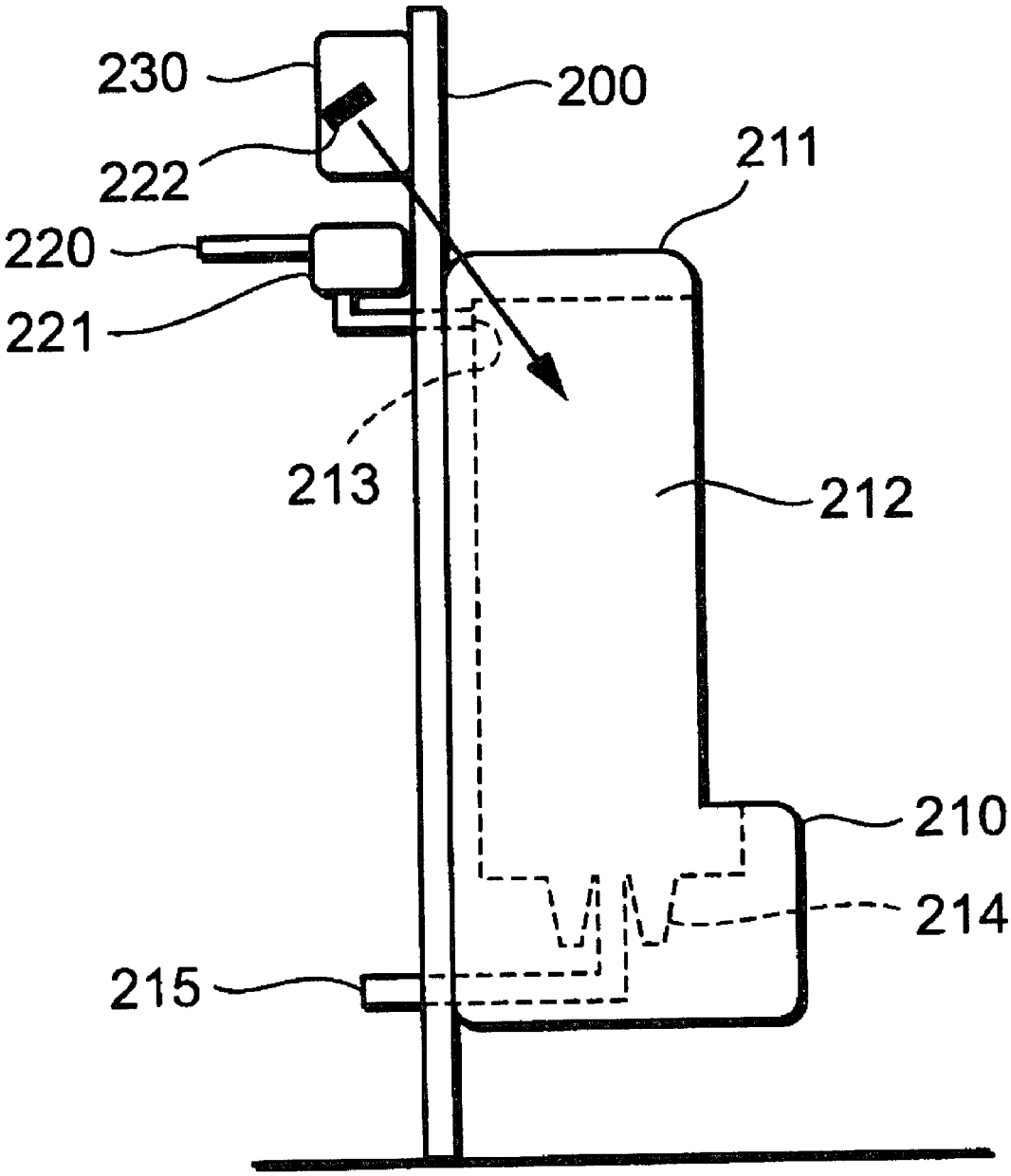
FIG. 41 is an illustrative view showing a further specific example of a Doppler sensor attached to the exterior of a toilet stool.

In contrast, a control portion 230b and Doppler sensor 222b shown in FIG. 41 are positioned on the upper side of the toilet main body 211 and can be mounted on the rear surface side of the panel 200.

In this case, the Doppler sensor 222b is mounted so as to transmit and receive radio waves facing diagonally downward from above the bowl portion 212.

Figure 42:
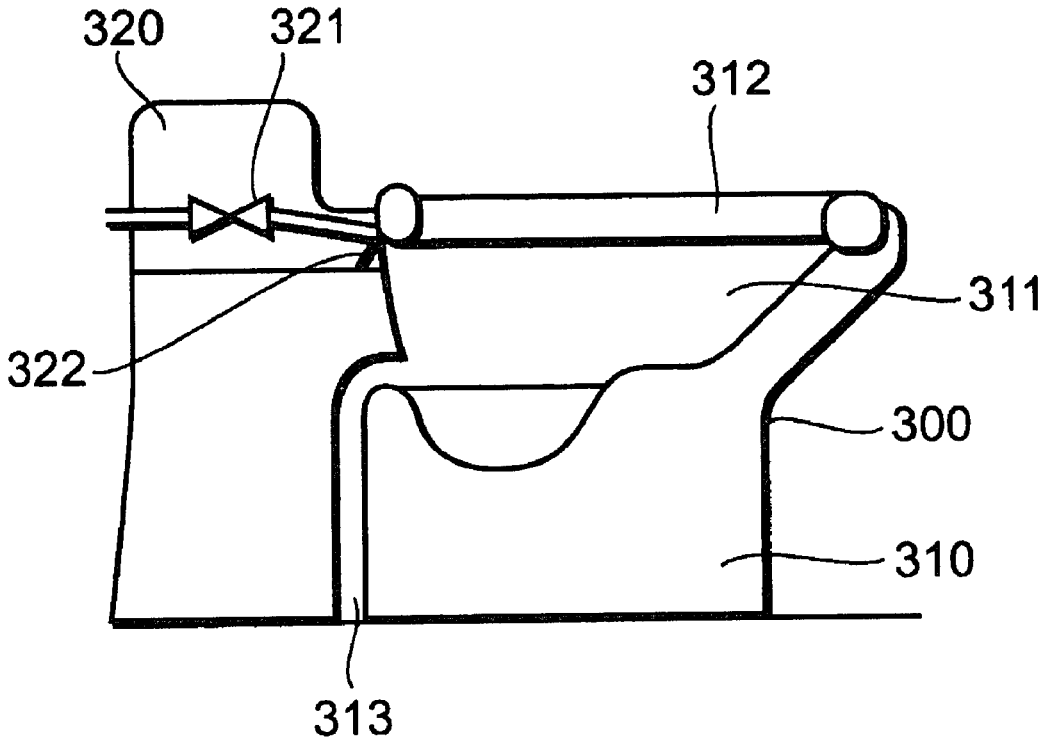
FIG. 42 is an illustrative view showing a specific example of a Doppler sensor attached to a water closet.

Next, FIG. 42 is a pattern diagram showing another example of application to a water closet. A bowl portion 311, a toilet seat 312, a drain 313, and so on are provided in a toilet main body 310 of a water closet 300. A function portion storage space 320 is provided on the rearward upper side of the toilet main body 310, and cleaning water supply valve 321 and Doppler sensor 322 are installed inside this space 320.

The Doppler sensor 322 is positioned on the exterior of the toilet main body 310 so as to transmit radio waves at a downward incline toward the bowl portion 311. Output signals from the Doppler sensor 322 are ignored during cleaning of the toilet stool using cleaning water in order to prevent the cleaning water from being mistakenly detected as urine.

Note that the present invention is not limited to the various embodiments described above. A person skilled in the art would be capable of making additions to, modifications of, and omissions from the constitution of the present invention within the scope thereof. For example, the Doppler sensor is not limited to a sensor which uses radio waves (microwaves), and a sensor which uses another type of waves such as ultrasonic waves or infrared rays may be provided instead.

What is claimed is:

[1. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means; and control means which perform control of said valve in accordance with the calculation result of said liquid flow condition calculation means;

wherein said liquid flow condition calculation means comprise time measuring means for measuring the time period during which it is determined that a liquid flow is present.]

[2. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the presence of a liquid flow in the bowl portion interior space based on the output of said frequency analysis means; and control means which perform control of said valve in accordance with the calculation result of said liquid flow condition calculation means;

wherein said frequency analysis means output a frequency spectrum by Fast Fourier Transform; and said liquid flow condition calculation means determine the presence of a liquid flow according to the presence of a frequency at or above a predetermined threshold and calculate a liquid flow rate on the basis of a maximum value of the frequency spectrum generated by Fast Fourier Transform.]

[3. The toilet cleaning device according to claim 2, characterized in that said liquid flow condition calculation means calculate the total liquid flow quantity by totaling the liquid flow rate during the time period in which it is determined that a liquid flow is present.]

[4. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means; and control means which perform control of said valve in accordance with the calculation result of said liquid flow condition calculation means;

wherein said Doppler sensor transmits radio waves from said transmission means in a substantially parallel direction to the flow direction along an inner wall surface of the bowl portion of the toilet stool.]

[5. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means; and control means which perform control of said valve in accordance with the calculation result of said liquid flow condition calculation means;

wherein said Doppler sensor transmits radio waves from said transmission means substantially in the direction toward a user position, said toilet cleaning device comprising user detection means for detecting the presence of a user of the toilet stool on the basis of the output of said Doppler sensor; and when said liquid flow condition calculation means determine that a liquid flow has disappeared and the output of said user detection means detects that no user is present, said valve is opened and cleaning water is supplied.]

[6. The toilet cleaning device according to claim 5, characterized in that when a predetermined length of time or more elapses after said liquid flow condition calculation means determine that a liquid flow has disappeared, said valve is opened and cleaning water is supplied.]

[7. The toilet cleaning device according to claim 6, characterized in that said valve is prohibited from being opened until a predetermined length of time elapses after said valve is closed following the opening of said valve.]

[8. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means; and control means which perform control of said valve in accordance with the calculation result of said liquid flow condition calculation means;

wherein said control means comprise cleaning condition determination means for determining the cleaning water supply condition based on the state of instruction to said valve and the output of said liquid flow condition calculation means, and said toilet cleaning device comprises outside output means for outputting the output of said cleaning condition determination means to the outside of the toilet cleaning device.]

[9. The toilet cleaning device according to claim 2, wherein said valve comprises cleaning water quantity adjustment means, and said toilet cleaning device comprises control means for controlling said cleaning water quantity adjustment means based on the output of said liquid flow condition calculation means.]

[10. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means; and control means which perform control of said valve in accordance with the calculation result of said liquid flow condition calculation means;

wherein said Doppler sensor is disposed in the interior of the toilet main body such that the transmission direction of the radio waves from said transmission means is substantially orthogonal to the interior surface of the main body of the toilet stool.]

[11. The toilet cleaning device according to claim 10, characterized in that said Doppler sensor is disposed in the interior of the toilet main body, and a plate material for preventing the reflection of radio waves on the surface of the toilet main body is provided in close contact with a region of the surface of the toilet main body through which radio waves transmitted.]

[12. A toilet cleaning device for controlling the opening/closing of a valve provided in cleaning water pipe which enables cleaning water to be supplied to a toilet main body, characterized in comprising:

transmission means for transmitting radio waves toward a space in the vicinity of a bowl portion interior space or an opening portion of the bowl portion of a toilet stool;

reception means for receiving reflected waves of the radio waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means; and control means which perform control of said valve in accordance with the calculation result of said liquid flow condition calculation means;

wherein a water spout portion is provided downstream of said valve for discharging cleaning water to the inner wall surface of said bowl portion, and the velocity of the cleaning water discharged from said water spout portion is caused to differ from a typical urine flow velocity.]

[13. A toilet cleaning device for controlling the opening/closing of a valve provided in cleaning water pipe which enables cleaning water to be supplied to a toilet main body, characterized in comprising:

transmission means for transmitting oscillatory waves in the direction toward a user position positioned in the vicinity of an opening portion of a bowl portion of a toilet stool;

reception means for receiving reflected waves of the oscillatory waves transmitted by said transmission means;

a Doppler sensor provided for generating a differential signal corresponding to the difference between the frequency of a signal received by said reception means and the frequency of a signal transmitted by said transmission means;

frequency analysis means for analyzing the frequency of the output of said Doppler sensor;

liquid flow condition calculation means for calculating the liquid flow condition in the bowl portion interior space based on the output of said frequency analysis means;

control means which perform control of said valve in accordance with the calculation result of said liquid flow condition calculation means;

opening/closing means for opening and closing a toilet seat and toilet lid which are rotatably mounted on said toilet main body; and user detection means for detecting the presence of a user of the toilet based on the output of said Doppler sensor;

wherein said control means instruct said opening/closing means to open the toilet seat and toilet lid when a user is detected by said user detection means, instruct said opening/closing means to close the toilet seat and toilet lid when said user detection means cease to detect the user following detection of a liquid flow by said liquid flow condition calculation means, and then open said valve such that cleaning water is supplied.]

[14. A toilet cleaning device for controlling the opening/closing of a valve provided in cleaning water pipe which enables cleaning water to be supplied to a toilet main body, characterized in comprising:

transmission means for transmitting oscillatory waves toward a space in the vicinity of a bowl portion interior space or an opening portion of the bowl portion of a toilet stool;

reception means for receiving reflected waves of the oscillatory waves transmitted by said transmission means;

a Doppler sensor provided for generating a differential signal corresponding to the difference between the frequency of a signal received by said reception means and the frequency of a signal transmitted by said transmission means;

liquid flow condition calculation means for calculating the liquid flow condition in said bowl portion interior space based on the output of said Doppler sensor; and control means which perform control of said valve in accordance with the calculation result of said liquid flow condition calculation means;

wherein said control means are further provided with cleaning condition determination means for determining whether or not the cleaning water supply condition is normal based on the state of instruction to said valve and the calculation result of said liquid flow condition calculation means.]

[15. A toilet cleaning device for controlling the opening/closing of a valve provided in cleaning water pipe which enables cleaning water to be supplied to a toilet main body, characterized in comprising:

transmission means for transmitting oscillatory waves toward a space in the vicinity of a bowl portion interior space or an opening portion of the bowl portion of a toilet stool;

reception means for receiving reflected waves of the oscillatory waves transmitted by said transmission means;

a Doppler sensor provided for generating a differential signal corresponding to the difference between the frequency of a signal received by said reception means and the frequency of a signal transmitted by said transmission means;

liquid flow condition calculation means for calculating the liquid flow condition in said bowl portion interior space based on the output of said Doppler sensor; and control means which perform control of said valve in accordance with the calculation result of said liquid flow condition calculation means;

wherein said liquid flow condition calculation means also measure a liquid flow existence period on the basis of an output signal from said Doppler sensor, and determine a total liquid flow quantity by totaling the liquid flow rate during the measured liquid flow existence period; and said control means control the opening and closing of said valve such that cleaning water is supplied in accordance with said total liquid flow quantity determined by totaling liquid flow rate.]

[16. A toilet cleaning device for controlling the opening/closing of a valve provided in cleaning water pipe which enables cleaning water to be supplied to a toilet main body, characterized in comprising:

transmission means for transmitting oscillatory waves toward a space in the vicinity of a bowl portion interior space or an opening portion of the bowl portion of a toilet stool;

reception means for receiving reflected waves of the oscillatory waves transmitted by said transmission means;

a Doppler sensor provided for generating a differential signal corresponding to the difference between the frequency of a signal received by said reception means and the frequency of a signal transmitted by said transmission means;

liquid flow condition calculation means for calculating the liquid flow condition in said bowl portion interior space based on the output of said Doppler sensor; and control means which perform control of said valve in accordance with the calculation result of said liquid flow condition calculation means;

wherein said control means also detect whether or not a user has approached said toilet main body on the basis of an output signal from said Doppler sensor, and detect whether or not urination has been performed into said bowl portion from the calculation result of said liquid flow condition calculation means, such that when said user approaches said toilet main body, cleaning water is supplied briefly to perform pre-cleaning, and when said user completes urination, cleaning water is supplied to perform post-cleaning.]

[17. A toilet cleaning device for controlling the opening/closing of a valve provided in cleaning water pipe which enables cleaning water to be supplied to a toilet main body, characterized in comprising:

transmission means for transmitting oscillatory waves toward a space in the vicinity of a bowl portion interior space or an opening portion of the bowl portion of a toilet stool;

reception means for receiving reflected waves of the oscillatory waves transmitted by said transmission means;

a Doppler sensor provided for generating a differential signal corresponding to the difference between the frequency of a signal received by said reception means and the frequency of a signal transmitted by said transmission means;

liquid flow condition calculation means for calculating the liquid flow condition in said bowl portion interior space based on the output of said Doppler sensor;

control means which perform control of said valve in accordance with the calculation result of said liquid flow condition calculation means; and urinary calculus prevention fluid supply means for introducing urinary calculus prevention fluid into a drain pipe to prevent the formation of urinary calculi calculus in said drain pipe;

wherein said liquid flow condition calculation means also measure a liquid flow existence period on the basis of an output signal from said Doppler sensor, and determine a total liquid flow quantity by totaling the liquid flow rate during the measured liquid flow existence period; and said control means supply cleaning water in accordance with said total liquid flow quantity determined by totaling liquid flow rate, and also adjust at least one of the concentration of said urinary calculus prevention fluid or the supply rate of said urinary calculus prevention fluid in accordance with said total liquid flow quantity determined by totaling liquid flow rate.]

[18. The toilet cleaning device according to any of claims 13 through 17, characterized in that said Doppler sensor is provided such that oscillatory waves are transmitted from the back face side of said toilet main body through said toilet main body toward said bowl portion interior space of the toilet stool, and at least the part of said toilet main body through which said oscillatory waves pass is partially or entirely formed so as to be permeable to said oscillatory waves.]

[19. The toilet cleaning device according to any of claims 13 through 17, characterized in that said Doppler sensor generates any one of radio waves, light waves, and sound waves as said oscillatory waves, and outputs signals based on the difference between the transmission frequency and reception frequency thereof.]

*20. A toilet cleaning device for controlling the opening/closing of a valve provided in a cleaning water pipe which enables cleaning water to be supplied to a toilet main body, comprising:*

*an antenna transmitting radio waves toward a space in the vicinity of a bowl portion interior space or an opening portion of the bowl portion of a toilet stool and receiving the radio waves which are reflected from a stream of urine;*

*a Doppler sensor generating a differential signal corresponding to the difference between the frequency of a signal received by said antenna and the frequency of a signal transmitted by said antenna;*

*a first controller analyzing the frequency of the output of said Doppler sensor;*

*a liquid flow rate calculator, calculating the flow rate of urine in the bowl portion interior space; and*

*a second controller performing control of said valve in accordance with the calculation result of said liquid flow rate calculator.*

*21. The toilet cleaning device according to claim 20, wherein the first controller is a filter which selectively passes a signal of a predetermined frequency range, and the liquid flow rate calculator determines presence or absence of liquid flow by comparing an output from the filter and a predetermined threshold value.*

*22. The toilet cleaning device according to claim 21, wherein said valve comprises a cleaning water quantity controller, and said toilet cleaning device comprises a controller for controlling said cleaning water quantity controller based on the output of said liquid flow rate calculator.*

*23. The toilet cleaning device according to claim 21, wherein in said liquid flow rate calculator calculates the total liquid flow quantity by totalling the liquid flow rate during the time period in which it is determined that a liquid flow is present.*

*24. The toilet cleaning device according to claim 20, wherein said liquid flow rate calculator comprises a time measurer measuring the time period during which it is determined that a liquid flow is present.*

*25. The toilet cleaning device according to claim 24, wherein said valve comprises a cleaning water quantity controller, and said toilet cleaning device comprises a controller for controlling said cleaning water quantity controller based on the output of said liquid flow rate calculator.*

*26. The toilet cleaning device according to claim 20, wherein said first controller outputs a frequency spectrum by fast Fourier transform; and*

*said liquid flow rate calculator determines the presence of a liquid flow according to the presence of a frequency at or above a predetermined threshold and calculates a liquid flow rate on the basis of a maximum value of the frequency spectrum generated by fast Fourier transform.*

*27. The toilet cleaning device according to claim 26, wherein said valve comprises a cleaning water quantity controller, and said toilet cleaning device comprises a controller for controlling said cleaning water quantity controller based on the output of said liquid flow rate calculator.*

*28. The toilet cleaning device according to claim 26, wherein in said liquid flow rate calculator calculates the total liquid flow quantity by totalling the liquid flow rate during the time period in which it is determined that a liquid flow is present.*

*29. The toilet cleaning device according to claim 20, wherein said Doppler sensor transmits radio waves from said antenna in a substantially parallel direction to the flow direction along an inner wall surface of the bowl portion of the toilet stool.*

*30. The toilet cleaning device according to claim 20,*

*wherein said Doppler sensor transmits radio waves from said antenna substantially in the direction toward a user position,*

*said toilet cleaning device comprising a detector detecting the presence of a user of the toilet stool on the basis of the output of said Doppler sensor; and*

*when said liquid flow rate calculator determines that a liquid flow has disappeared and the output of said detector detects that no user is present, said valve is opened and cleaning water is supplied.*

*31. The toilet cleaning device according to claim 30, wherein a predetermined length of time or more elapses after said liquid flow rate calculator determines that a liquid flow has disappeared, said valve is opened and cleaning water is supplied.*

*32. The toilet cleaning device according to claim 31, wherein said valve is prohibited from being opened until a predetermined length of time elapses after said valve is closed following the opening of said valve.*

*33. The toilet cleaning device according to claim 20, wherein said Doppler sensor is disposed in the interior of the toilet main body such that the transmission direction of the radio waves from said antenna is substantially orthogonal to the interior surface of the main body of the toilet stool.*

*34. The toilet cleaning device according to claim 20, wherein said liquid flow rate calculator also measures a liquid flow existence period on the basis of an output signal from said Doppler sensor, and determines a total liquid flow quantity by totalling the liquid flow rate during the measured liquid flow existence period; and*

*said second controller controls the opening and closing of said valve such that cleaning water is supplied in accordance with said total liquid flow quantity determined by totaling liquid flow rate.*

*35. The toilet cleaning device according to claim 20, wherein said second controller also detects whether or not a user has approached said toilet main body on the basis of an output signal from said Doppler sensor, and*

*detect whether or not urination has been performed into said bowl portion from the calculation result of said liquid flow rate calculator, such that when said user approaches said toilet main body, cleaning water is supplied briefly to perform pre-cleaning, and when said user completes urination, cleaning water is supplied to perform post-cleaning.*

*36. A method for cleaning a toilet by controlling the opening/closing of a valve provided in a cleaning water pipe which enables cleaning water to be supplied to a toilet main body, comprising:*

*transmitting radio waves, using an antenna, toward a space in the vicinity of a bowl portion interior space or an opening portion of the bowl portion of a toilet stool and receiving the radio waves which are reflected from a stream of urine;*

*generating a differential signal, using a Doppler sensor, corresponding to the difference between the frequency of a signal received by said antenna and the frequency of a signal transmitted by said antenna;*

*analyzing the frequency of the output of said Doppler sensor using a controller;*

*calculating the flow rate of urine in the bowl portion interior space using a liquid flow rate calculator; and*

*performing control of said valve in accordance with the calculation result of said liquid flow rate calculator.*

*37. A toilet cleaning device for controlling the opening/closing of a valve provided in a cleaning water pipe which enables cleaning water to be supplied to a toilet main body, comprising:*

*transmission means for transmitting radio waves toward a space in the vicinity of a bowl portion interior space or an opening portion of the bowl portion of a toilet stool;*

*reception means for receiving the radio waves transmitted by said transmission means and reflected from a stream of urine;*

*a Doppler sensor provided for generating a differential signal corresponding to the difference between the frequency of a signal received by said reception means and the frequency of a signal transmitted by said transmission means;*

*frequency analysis means for analyzing the frequency of the output of said Doppler sensor;*

*liquid flow condition calculation means for calculating the liquid flow condition in the bowl portion interior space based on the output of said frequency analysis means; and*

*control means which perform control of said valve in accordance with the calculation result of said liquid flow condition calculation means.*

*38. The toilet cleaning device according to claim 37, wherein the frequency analysis means is a filter which selectively passes a signal of a predetermined frequency range, and the liquid flow condition calculation means determines presence or absence of liquid flow by comparing an output from the filter and a predetermined threshold value.*

*39. The toilet cleaning device according to claim 38, wherein said valve comprises cleaning water quantity adjustment means, and said toilet cleaning device comprises control means for controlling said cleaning water quantity adjustment means based on the output of said liquid flow condition calculation means.*

*40. The toilet cleaning device according to claim 38, wherein said liquid flow condition calculation means calculate the total liquid flow quantity by totalling the liquid flow rate during the time period in which it is determined that a liquid flow is present.*

*41. The toilet cleaning device according to claim 37, wherein said liquid flow condition calculation means comprise time measuring means for measuring the time period during which it is determined that a liquid flow is present.*

*42. The toilet cleaning device according to claim 41, wherein said valve comprises cleaning water quantity adjustment means, and said toilet cleaning device comprises control means for controlling said cleaning water quantity adjustment means based on the output of said liquid flow condition calculation means.*

*43. The toilet cleaning device according to claim 37, wherein said frequency analysis means output a frequency spectrum by fast Fourier transform; and*

*said liquid flow condition calculation means determine the presence of a liquid flow according to the presence of a frequency at or above a predetermined threshold and calculate a liquid flow rate on the basis of a maximum value of the frequency spectrum generated by fast Fourier transform.*

*44. The toilet cleaning device according to claim 43, wherein said valve comprises cleaning water quantity adjustment means, and said toilet cleaning device comprises control means for controlling said cleaning water quantity adjustment means based on the output of said liquid flow condition calculation means.*

*45. The toilet cleaning device according to claim 43, wherein said liquid flow condition calculation means calculate the total liquid flow quantity by totalling the liquid flow rate during the time period in which it is determined that a liquid flow is present.*

*46. The toilet cleaning device according to claim 37, wherein said Doppler sensor transmits radio waves from said transmission means in a substantially parallel direction to the flow direction along an inner wall surface of the bowl portion of the toilet stool.*

*47. The toilet cleaning device according to claim 37, wherein said Doppler sensor transmits radio waves from said transmission means substantially in the direction toward a user position, said toilet cleaning device comprising user detection means for detecting the presence of a user of the toilet stool on the basis of the output of said Doppler sensor; and*

*when said liquid flow condition calculation means determine that a liquid flow has disappeared and the output of said user detection means detects that no user is present, said valve is opened and cleaning water is supplied.*

*48. The toilet cleaning device according to claim 47, wherein when a predetermined length of time or more elapses after said liquid flow condition calculation means determine that a liquid flow has disappeared, said valve is opened and cleaning water is supplied.*

*49. The toilet cleaning device according to claim 48, wherein said valve is prohibited from being opened until a predetermined length of time elapses after said valve is closed following the opening of said valve.*

*50. The toilet cleaning device according to claim 37, wherein said Doppler sensor is disposed in the interior of the toilet main body such that the transmission direction of the radio waves from said transmission means is substantially orthogonal to the interior surface of the main body of the toilet stool.*

*51. The toilet cleaning device according to claim 37, wherein said liquid flow condition calculation means also measure a liquid flow existence period on the basis of an output signal from said Doppler sensor, and determine a total liquid flow quantity by totalling the liquid flow rate during the measured liquid flow existence period; and*

*said control means control the opening and closing of said valve such that cleaning water is supplied in accordance with said total liquid flow quantity determined by totalling liquid flow rate.*

*52. The toilet cleaning device according to claim 37, wherein said control means also detect whether or not a user has approached said toilet main body on the basis of an output signal from said Doppler sensor, and*

*detect whether or not urination has been performed into said bowl portion from the calculation result of said liquid flow condition calculation means, such that when said user approaches said toilet main body, cleaning water is supplied briefly to perform pre-cleaning, and when said user completes urination, cleaning water is supplied to perform post-cleaning.*

*53. The toilet cleaning device according to claim 20, further comprising:*

*a user detector detecting a presence of a user of the toilet stool on a basis of the output of said Doppler sensor, wherein*

*the second controller performing control of said valve in accordance with a calculation result of said liquid flow rate calculator and a detection result of said user detector,*

*the first controller includes a high-pass filter which passes frequencies so that a waveform of a urination period alone is extracted from the output of said Doppler sensor and a low-pass filter which passes frequencies so that a waveform representing a movement of said user alone is extracted from the output of said Doppler sensor,*

*the user detector is adapted to detect the presence of said user in accordance with an output of the low-pass filter to obtain said detection result, and*

*said liquid flow rate calculator is adapted to compare the output of the high-pass filter with a predetermined threshold to obtain said comparison result.*

*54. The toilet cleaning device of claim 53, wherein said liquid flow calculator comprises:*

*a time measurer measuring the time period during which it is determined that a liquid flow is present.*

* * * * *

UNITED STATES PATENT AND TRADEMARK OFFICE

CERTIFICATE OF CORRECTION

PATENT NO. : RE42,840 E
APPLICATION NO. : 11/862563
DATED : October 18, 2011
INVENTOR(S) : Todoroki et al.

It is certified that error appears in the above-identified patent and that said Letters Patent is hereby corrected as shown below:

On the Title Page:

Item [22], Replace Filed: Sep. 27, 2007 with PCT Filed: Aug. 13, 2002.

Item [64], Replace PCT Filed: Aug 13, 2002 with Filed: Feb 7, 2005.

Item [64], Delete PCT No.: PCT/JP02/08251 through PCT Pub. Date: Mar. 13, 2003.

Add:

[86] PCT No: PCT/JP02/08251

§ 371 (c)(1),
(2),(4) Date: Feb. 7, 2005

[87] PCT Pub. No.: WO03/021052

PCT Pub. Date: Mar. 13, 2003

Signed and Sealed this
First Day of November, 2011

David J. Kappos

David J. Kappos
*Director of the United States Patent and Trademark Office*